US012116227B2

(12) United States Patent
Wada et al.

(10) Patent No.: US 12,116,227 B2
(45) Date of Patent: Oct. 15, 2024

(54) IMAGE FORMING APPARATUS

(71) Applicant: FUJIFILM Business Innovation Corp., Tokyo (JP)

(72) Inventors: Tomohiro Wada, Kanagawa (JP); Tomoaki Yoshioka, Kanagawa (JP); Satoshi Shigezaki, Kanagawa (JP); Yoko Miyamoto, Kanagawa (JP); Toshiaki Baba, Kanagawa (JP); Haruka Kobayashi, Kanagawa (JP); Kazuyoshi Hagiwara, Kanagawa (JP); Kazuki Kishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 100 days.

(21) Appl. No.: 17/964,048

(22) Filed: Oct. 12, 2022

(65) Prior Publication Data

US 2023/0122708 A1 Apr. 20, 2023

(30) Foreign Application Priority Data

Oct. 15, 2021 (JP) ................................ 2021-169888

(51) Int. Cl.
*B65H 29/04* (2006.01)
*B41F 21/08* (2006.01)
(Continued)

(52) U.S. Cl.
CPC ............ *B65H 29/06* (2013.01); *B41F 21/08* (2013.01); *B65H 5/085* (2013.01); *B65H 29/04* (2013.01);
(Continued)

(58) Field of Classification Search
CPC ....... B41F 21/08; B65H 29/04; B65H 29/041; B65H 29/042; B65H 29/044; B65H 29/06; B65H 5/085
See application file for complete search history.

(56) References Cited

U.S. PATENT DOCUMENTS 5,289,768 A * 3/1994 Keller .................. B65H 29/044 101/183
8,254,817 B2 8/2012 Kamijo et al.
(Continued)

FOREIGN PATENT DOCUMENTS

JP 5278687 9/2013

*Primary Examiner* — Luis A Gonzalez
(74) *Attorney, Agent, or Firm* — JCIPRNET

(57) ABSTRACT

An image forming apparatus includes: a holding body configured to hold a formed image; a conveyance unit configured to convey a recording medium with a leading end of the recording medium gripped by a gripping portion; and a transfer body including a recessed portion that accommodates the gripping portion and is provided along a direction substantially orthogonal to a rotational direction, configured to sandwich the recording medium conveyed by the conveyance unit between the transfer body and the holding body to transfer an image on the holding body to the recording medium conveyed by the conveyance unit, and including a slope surface provided at a leading end of a portion of an outer circumference not including a portion where the recessed portion is provided, the leading end being on a front end side in the rotational direction, a distance from the slope surface to a rotational center becoming larger toward a downstream side in the rotational direction.

7 Claims, 22 Drawing Sheets

(51) Int. Cl.
*B65H 5/08* (2006.01)
*B65H 29/06* (2006.01)

(52) U.S. Cl.
CPC ......... *B65H 29/041* (2013.01); *B65H 29/042* (2013.01); *B65H 2404/521* (2013.01); *B65H 2801/03* (2013.01)

(56) References Cited

U.S. PATENT DOCUMENTS

| | | | | |
|---|---|---|---|---|
| 8,351,832 | B2 * | 1/2013 | Kamijo .............. | G03G 15/0131 399/388 |
| 2021/0294246 | A1 * | 9/2021 | Yoshioka ........... | G03G 15/2053 |
| 2022/0097993 | A1 * | 3/2022 | Baba ...................... | B41J 11/057 |

* cited by examiner

*FIG. 14*

| $\theta 2-\theta 1$ (°) | −16 | −12 | −8 | −4 | 0 | 4 |
|---|---|---|---|---|---|---|
| EVALUATION OF IMAGE SHIFT AMOUNT | × | ○ | ○ | ○ | ○ | × |

○: GOOD
×: BAD

| L (mm) | 2 | 3 | 5 |
|---|---|---|---|
| EVALUATION OF IMAGE SHIFT AMOUNT | × | ○ | ○ |

○: GOOD
×: BAD

IMAGE FORMING APPARATUS

CROSS-REFERENCE TO RELATED APPLICATIONS

This application is based on and claims priority under 35 USC 119 from Japanese Patent Application No. 2021-169888 filed Oct. 15, 2021.

BACKGROUND

(i) Technical Field

The present invention relates to an image forming apparatus.

(ii) Related Art

JP5278687B discloses an image forming apparatus in which a transfer material such as paper is electrostatically attracted to a secondary transfer roller when the transfer material passes through a secondary transfer nip in a secondary transfer unit while being gripped by a transfer material gripping mechanism in a recessed groove provided in a roller body.

Some large-sized image forming apparatuses employ such a configuration that an image on a holding body such as an intermediate transfer body is transferred to a recording medium by the recording medium being conveyed in a state where a holding unit holding a leading end of the recording medium such as a sheet is accommodated in a recessed portion of a transfer body. In the image forming apparatus having such a configuration, since the leading end of the recording medium is held at a position further inward than a surface of the transfer body, the recording medium may be lifted, losing close contact with the transfer body. When the recording medium is lifted from the transfer body, the recording medium and the intermediate transfer body may contact each other before the recording medium advances to a transfer position, which may cause a shift in transferring an image.

SUMMARY

Aspects of non-limiting embodiments of the present disclosure relate to an image forming apparatus capable of suppressing the lifting of a recording medium from a transfer body when an image on a holding body is transferred to the recording medium by the recording medium being conveyed in a state where a leading end of the recording medium is held at a position further inward than a surface of the transfer body, as compared with a case where no slope surface is provided on a leading end of an outer circumference of the transfer body. Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus according to a first aspect of the present invention includes a holding body that holds a formed image,

- a conveyance unit configured to convey a recording medium in a state where a leading end of is gripped by a gripping portion, and

- a transfer body including a recessed portion that accommodates the gripping portion and is provided along a direction substantially orthogonal to a rotational direction, configured to sandwich the recording medium conveyed by the conveyance unit between the transfer body and the holding body to transfer an image on the holding body to the recording medium conveyed by the conveyance unit, and including a slope surface provided at a leading end of a portion of an outer circumference not including a portion where the recessed portion is provided, the leading end being on a front end side in the rotational direction, a distance from the slope surface to a rotational center becoming larger toward a downstream side in the rotational direction.

BRIEF DESCRIPTION OF THE DRAWINGS

FIG. 14 is a figure showing evaluation results of image shift amounts resulting from varied relationship between the angle θ1 of the gripping surface 120 of the gripper 36 and the angle θ2 which is a slope angle of the tapered surface 104.

DETAILED DESCRIPTION

An embodiment according to the present invention will be described in detail below with reference to the drawings. For convenience of description, in FIG. 1, a direction along an arrow H is referred to as an up-down direction of an image forming apparatus 10, a direction along an arrow W is referred to as a width direction of the image forming apparatus 10, and a direction along an arrow D is referred to as a front-rear direction of the image forming apparatus 10.

Figure 1:
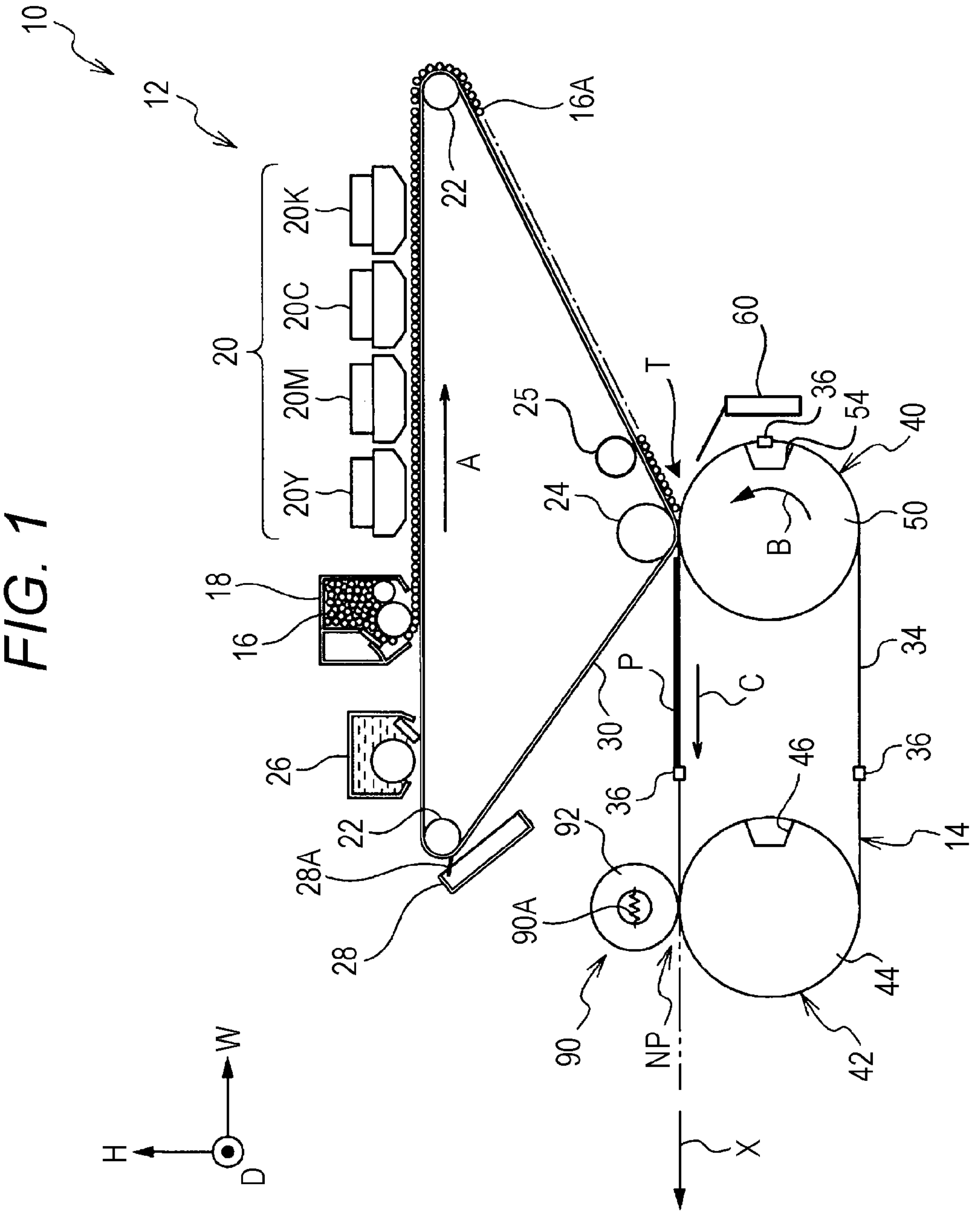
FIG. 1 is a schematic diagram illustrating an image forming apparatus 10 according one embodiment of the present invention.

FIG. 1 illustrates the image forming apparatus 10 having a configuration in which an ink image is formed on a recording medium P by, for example, an inkjet method. The image forming apparatus 10 includes an image forming unit 12, a conveyance unit 14, and a fixing device 90.

Now, the image forming unit 12, the conveyance unit 14, and the fixing device 90 of the image forming apparatus 10 will be described, and then a transfer body 50 as an example of a body member will be described.

<Image Forming Unit 12>

As illustrated in FIG. 1, the image forming unit 12 has a function of forming an ink image on the recording medium P. To describe specifically, the image forming unit 12 includes a transfer belt 30 as an example of an intermediate transfer body, two rollers 22, an opposing roller 24 as an example of a rotating member, an adhesive layer forming device 26, a particle supply device 18, a discharge head 20, a transfer unit 40, and a cleaner 28.

The transfer belt 30 is formed as an endless belt, and is looped around the two rollers 22, the opposing roller 24, and a support roller 25 so as to have an inverted triangular shape in a view along the front-rear direction. The transfer belt 30 takes a form of a belt, and circulates in the direction indicated by an arrow A by at least one of the two rollers 22 being rotationally driven.

The adhesive layer forming device 26, the particle supply device 18, the discharge head 20, the transfer unit 40, and the cleaner 28 are disposed on the outer circumferential surface side of the transfer belt 30 in this order from the upstream side along the circulating direction of the transfer belt 30 (hereinafter referred to as "belt circulating direction").

The adhesive layer forming device 26 is disposed at an end on one side (left side in the figure), regarding the width direction of the apparatus, of a horizontal section of the transfer belt 30 taking a form of an inverted triangular shape. The adhesive layer forming device 26 houses an adhesive, and is configured to form an adhesive layer (not illustrated) by applying the adhesive to the outer circumferential surface of the circulating transfer belt 30. Examples of the adhesive include, for example, glues and organic solvents.

The particle supply device 18 is disposed on the downstream side (right side in the figure), regarding the belt circulating direction, of the adhesive layer forming device 26 along the horizontal section of the transfer belt 30. The particle supply device 18 holds therein ink absorbing particles 16 capable of absorbing ink droplets, and is configured to supply the ink absorbing particles 16 to the transfer belt 30 on which the adhesive layer is formed.

That is, the ink absorbing particles 16 supplied onto the transfer belt 30 by the particle supply device 18 adhere to the adhesive layer by the adhesive force of the adhesive layer to form an ink absorbing particle layer 16A on the transfer belt 30.

The discharge head 20 is disposed on the downstream side (right side in the figure), regarding the belt circulating direction, of the particle supply device 18 along the horizontal section of the transfer belt 30. A plurality of discharge heads 20 are provided so as to form ink images in respective colors. In the embodiment, the discharge heads 20 for the four colors of yellow (Y), magenta (M), cyan (C), and black (K) are provided. In FIG. 1, an alphabetical letter Y, M, C, or K is added after the reference numeral 20 of the corresponding color.

The discharge head 20 of each of the colors is configured to form an ink image based on image data by discharging ink droplets from nozzles (not illustrated) onto the ink absorbing particle layer 16A by a known method, such as a thermal method or a piezoelectric method. That is, the ink droplets discharged from the discharge heads 20 of the respective colors are absorbed by the ink absorbing particle layer 16A to form an ink image.

In this manner, the transfer belt 30 functions as a holding body that holds the formed image.

Figure 2:
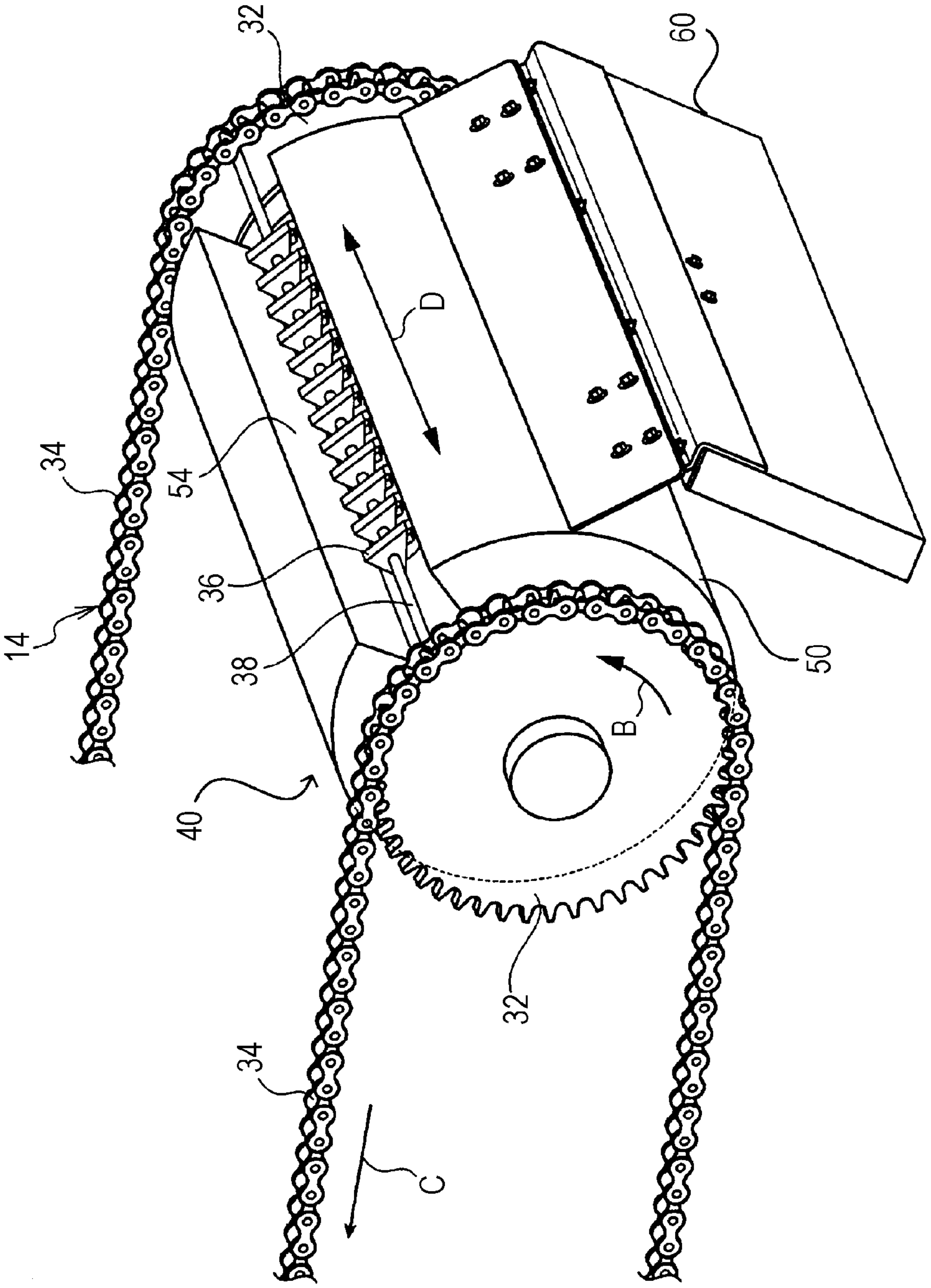
FIG. 2 is a perspective view illustrating a configuration of a transfer unit 40 according to one embodiment of the present invention.

The transfer unit 40 is disposed below the transfer belt 30. As illustrated in FIG. 2, the transfer unit 40 includes the transfer body 50 disposed so as the axial direction of the transfer body 50 to be the same as the axial direction of the opposing roller 24, and a sliding member 60 disposed close to the transfer body 50. The transfer body 50 is disposed so as to oppose the transfer belt 30, and forms a nip region T where the transfer belt 30 is sandwiched between the transfer body 50 and the opposing roller 24. That is, the opposing roller 24 presses the transfer belt 30 from the inner side to form the nip region T which is a transfer position. The sliding member 60 will be described in detail later.

In the embodiment, by circulation of the transfer belt 30, the ink image formed in the ink absorbing particle layer 16A is conveyed to the nip region T, and the conveyance unit 14 conveys the recording medium P to the nip region T. The recording medium P and the ink image conveyed to the nip region T are sandwiched between the transfer body 50 and the transfer belt 30 and pressed, and thereby the ink image is transferred to the recording medium P.

In FIG. 1, the conveyance direction of the recording medium P is indicated by an arrow X. When sandwiching and pressing the recording medium P and the ink image between the transfer body 50 and the transfer belt 30 in the nip region T, the transfer body 50 may heat the recording medium P and the ink image. At a portion of the outer circumferential surface of the transfer body 50, a recess 54, which is a recessed portion in which a gripper 36 and a support member 38 which will be described later are accommodated, is formed.

A configuration of the transfer unit 40 of the embodiment will be described with reference to a perspective view in FIG. 2. As illustrated in FIG. 2, a pair of sprockets 32 is provided at two ends in the axial direction of the transfer body 50. A pair of sprockets 32 is disposed coaxially with the transfer body 50, and integrally rotates with the transfer body 50. The transfer body 50 is rotationally driven by a drive unit (not illustrated). Chains 34 are looped around a pair of sprockets 32.

The sliding member 60 functions as a load-applying unit that applies a conveyance load to the recording medium P conveyed to the transfer position where the image on the transfer belt 30 is transferred to the recording medium P. Specifically, the sliding member 60 is disposed close to but without contacting the surface of the transfer body 50, and is configured to slide against the recording medium P that is being conveyed. The term "sliding" means such a state that two objects move while touching each other.

The phrase "disposed close to" means that the sliding member 60 is disposed such that the sliding member 60 and the transfer body 50 are not in direct contact with each other when the recording medium P is not conveyed, but when the recording medium P is conveyed in such a state that the recording medium P is not closely attached to, that is, lifted from, the transfer body 50, the recording medium P and the sliding member 60 contact each other. Note that, the distance between the sliding member 60 and the transfer body 50 may be set such that when the recording medium P is thin and closely attached to the transfer body 50, the sliding member 60 is not in contact with the recording medium P.

As illustrated in FIG. 1, the cleaner 28 is disposed on the downstream side of the nip region T but on the upstream side of the adhesive layer forming device 26 regarding the belt circulating direction. The cleaner 28 includes a blade 28A that contacts the outer circumferential surface of the transfer belt 30. The cleaner 28 is configured to remove with the blade 28A, along with circulation of the transfer belt 30, the adhesive layer, the ink absorbing particles 16, ink, and other objects (for example, paper dust, when the recording medium P is paper) that have passed through the nip region T and remained on the transfer belt 30.

The opposing roller 24 is configured to be movable, by a moving mechanism-for-transfer (not illustrated) using a cam or the like, between a contact position where the opposing roller 24 indirectly contacts the transfer body 50 and a separated position where the opposing roller 24 is separated from the transfer body 50. To describe specifically, the opposing roller 24, for example, is configured to be always pushed or pulled by the elastic force of an elastic member such as a spring toward the contact position, and move by the moving mechanism-for-transfer to the separated position against the elastic force.

The support roller 25 that supports the transfer belt 30 is disposed on the upstream side of the opposing roller 24 in the conveyance direction. By moving the set position of the support roller 25 closer to or away from the opposing roller 24, the pressure and the contact area of a contact region between the transfer belt 30 and the transfer body 50 can be adjusted.

As described above, the transfer body 50 has a substantially circular cross section, and includes the recess 54 that accommodates the gripper 36 and is provided along a direction substantially orthogonal to the rotational direction. The transfer body 50 and the transfer belt 30 sandwich therebetween the recording medium P conveyed by the conveyance unit 14, and thereby the image on the transfer belt 30 is transferred to the recording medium P that is conveyed by the conveyance unit 14. The phrase "substantially orthogonal" means that the angle between two directions is in a range from 85 to 95 degrees.

<Fixing Device 90>

As illustrated in FIG. 1, the fixing device 90 fixes the ink image that has been transferred to the recording medium P onto the recording medium P. To describe specifically, the fixing device 90 includes a pressing body 42 and a heating roller 92 that are disposed on the downstream side of the recording medium P in the conveyance direction in the conveyance unit 14.

Figure 3:
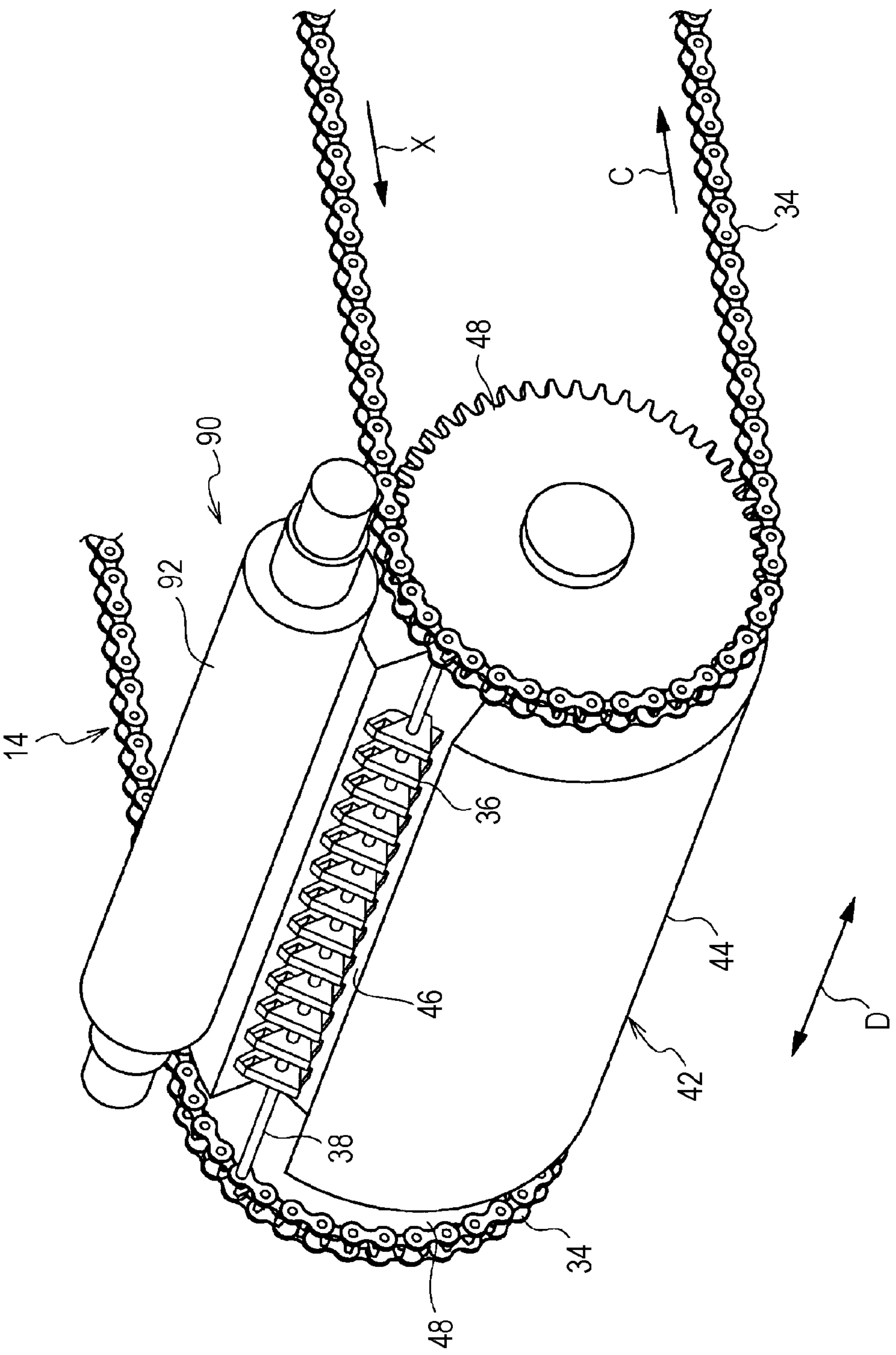
FIG. 3 is a perspective view illustrating a configuration of a fixing device 90 according to one embodiment of the present invention.

A configuration of the fixing device 90 in the embodiment will be described with reference to a perspective view in FIG. 3. As illustrated in FIG. 3, the pressing body 42 includes a pressing roller 44 disposed so as the axial direction of the pressing roller 44 to be the same as the axial direction of the transfer body 50, and a pair of sprockets 48 is provided at two ends in the axial direction of the pressing roller 44. A pair of sprockets 48 is disposed coaxially with the pressing roller 44, and integrally rotates with the pressing roller 44. The chains 34 described above is looped around a pair of sprockets 48.

As illustrated in FIG. 1, the heating roller 92 and the pressing roller 44 are arranged along the up-down direction. That is, the heating roller 92 is disposed above the pressing roller 44. The heating roller 92 includes therein a heating source 90A (see FIG. 1) such as a halogen lamp. Hereinafter, a place at which the recording medium P is sandwiched by the heating roller 92 and the pressing roller 44 is referred to as a nip position NP.

The heating roller 92 is configured to be movable, by a moving mechanism-for-fixing (not illustrated) using a cam or the like, between a contact position where the heating roller 24 directly or indirectly contacts the pressing roller 44 and a separated position where the heating roller 92 is separated from the pressing roller 44. To describe specifically, the heating roller 92, for example, is configured to be always pressed or pulled toward the contact position by the elastic force of an elastic member such as a spring, and move to the separated position against the elastic force by the moving mechanism-for-fixing. The heating roller 92 is configured to sandwich the recording medium P with the pressing roller 44 at the contact position.

In the embodiment, the heating roller 92 is rotationally driven, whereby the pressing roller 44 is driven to rotate, but the heating roller 92 and the pressing roller 44 may be both rotationally driven. At a portion of the outer circumferential surface of the pressing roller 44, a recess 46 may be formed to accommodate the gripper 36 and the support member 38 which will be described later.

<Conveyance Unit 14>

As illustrated in FIGS. 1 to 3, the conveyance unit 14 has a function of conveying the recording medium P to pass through the nip region T and the nip position NP. The conveyance unit 14 includes a pair of chains 34 and the gripper 36. A pair of chains 34 is an example of a driving force transmission member, and the gripper 36 is an example of a gripping portion that holds the leading end portion of the recording medium P. In FIG. 1, the chain 34 and the gripper 36 are illustrated in a simplified manner. Accordingly, the conveyance unit 14 conveys the recording medium P with the gripper 36, which is a gripping portion, gripping the leading end of the recording medium P.

As illustrated in FIG. 1, each of a pair of chains 34 is formed in an annular shape. As illustrated in FIGS. 2 and 3, a pair of chains 34 is disposed to be separated from each other along the depth direction of apparatus. That is, a pair of chains 34 is looped around a pair of sprockets 32 provided coaxially with the transfer body 50 and a pair of sprockets 48 provided coaxially with the pressing roller 44.

When the transfer body 50 is rotationally driven by the drive unit (not illustrated), a pair of sprockets 32 is also integrally rotationally driven in a rotational direction B (direction indicated by an arrow B), whereby the chains 34 circulate in a circulating direction C (direction indicated by an arrow C). This causes the pressing roller 44 to rotate. That is, the rotational driving force of the transfer body 50 is transmitted to the pressing roller 44 by a pair of chains 34 that circulates in the circulating direction C (see FIG. 1).

As illustrated in FIGS. 2 and 3, the support member 38 to which the gripper 36 is attached is bridged between a pair of chains 34 in the depth direction of apparatus. In the present embodiment, three support members 38 are provided and fixed to a pair of chains 34 at a predetermined interval along the circumferential direction (circulating direction C) of the chains 34.

A plurality of grippers 36 are attached to the support members 38 in such a manner as to be arranged at a predetermined interval in the depth direction of apparatus. That is, the grippers 36 are attached to the chains 34 via the support members 38. Each gripper 36 has a function of holding the leading end of the recording medium P.

Figure 4:
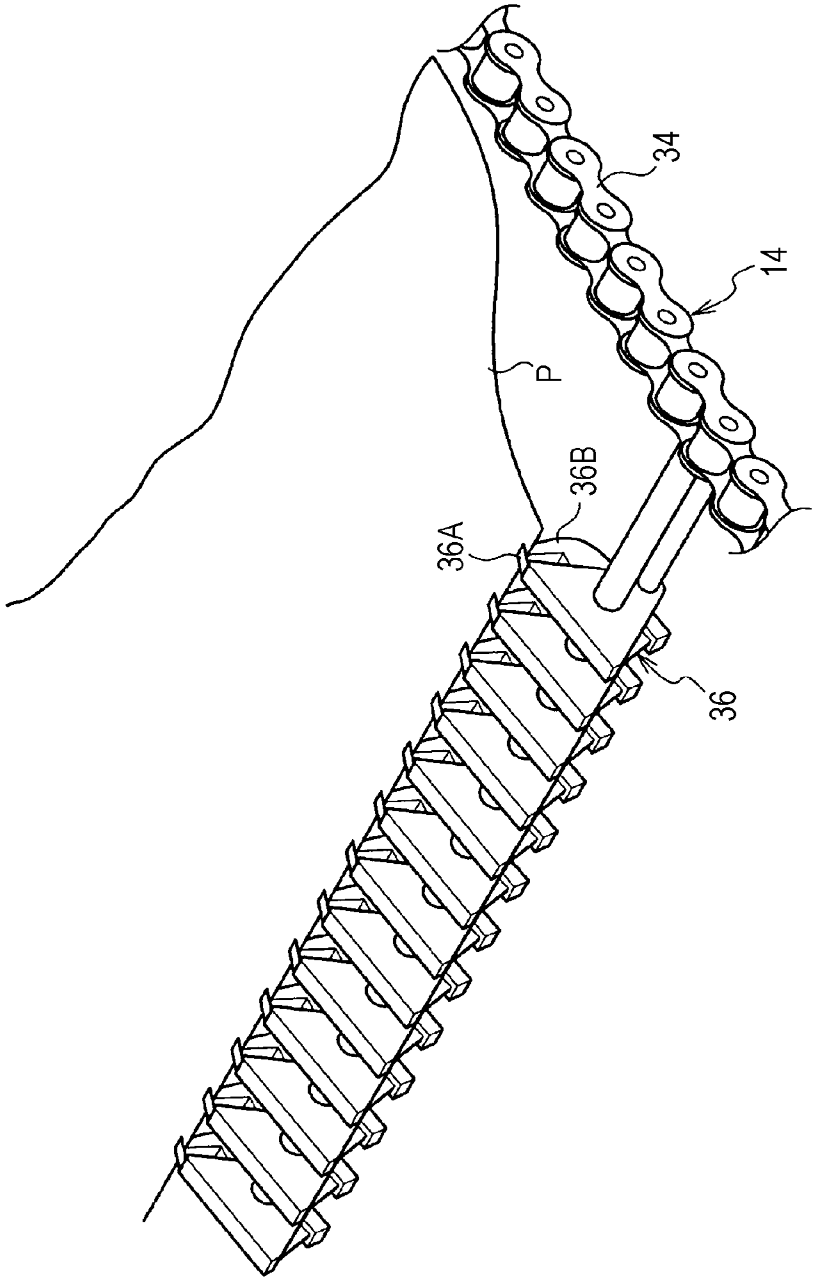
FIG. 4 is a perspective view illustrating a gripper 36 according to one embodiment of the present invention.

To describe specifically, as illustrated in FIG. 4, the gripper 36 includes a plurality of claws 36A and a plurality of claw bases 36B. The gripper 36 holds the recording medium P by sandwiching the leading end of the recording medium P between the claws 36A and the claw bases 36B. Thus, the gripper 36 is an example of a sandwiching portion that sandwiches the recording medium P in the thickness direction.

The gripper 36 is configured to hold the leading end of the recording medium P from the downstream side in the conveyance direction of the recording medium P. The gripper 36 is configured such that, for example, the claw 36A is pressed against the claw base 36B by a spring or the like, and the claw 36A is separated from the claw base 36B by the action of a cam or the like.

In this manner, in the conveyance unit 14, the leading end of the recording medium P fed from a container (not illustrated) is held by the gripper 36. The conveyance unit 14 is configured that circulation of the chains 34 in the circulating direction C with the gripper 36 holding the leading end of the recording medium P moves the gripper 36 to convey the recording medium P, and the recording medium P still being held by the gripper 36 passes through the nip region T together with the gripper 36.

Each of a pair of chains 34 has a length that is an integral multiple of the outer circumference of the sprocket 32 of the transfer unit 40 and the sprocket 48 of the pressing body 42. Three support members 38 are provided at places on the chain 34 corresponding to the positions of the recess 54 of the transfer body 50 and the recess 46 of the pressing roller 44. Therefore, when the gripper 36 arrives at the transfer body 50 along with circulation of the chains 34, the gripper 36 is accommodated in the recess 54 of the transfer body 50 and in this state integrally moves with the transfer body 50. Similarly, when the gripper 36 arrives at the pressing roller 44 along with circulation of the chains 34, the gripper 36 is accommodated in the recess 46 of the pressing roller 44 and in this state integrally moves with the pressing roller 44.

The conveyance unit 14 of the embodiment is configured that, when the heating roller 92 is at the separated position, the recording medium P is conveyed toward the nip position NP with the gripper 36 holding the leading end of the recording medium P. The conveyance unit 14 is also configured to release holding of the leading end of the recording medium P when the recording medium P is conveyed to the nip position NP.

That is, the conveyance unit 14 is configured to release holding of the leading end of the recording medium P after the gripper 36 has passed through the nip position NP. At the timing of this release, the pressing roller 44 is kept rotating, in other words, the chains 34 is kept circulating.

That the recording medium P has been conveyed to the nip position NP is detected by, for example, an elapsed time after a detector provided on the upstream side of the nip position NP in the conveyance direction detects the leading end of the recording medium P. The detector may detect the support member 38 or the gripper 36 instead of the leading end of the recording medium P.

After the gripper 36 has passed through the nip position NP and holding of the leading end of the recording medium P by the gripper 36 has been released, the heating roller 92 starts moving from the separated position to the contact position to sandwich the recording medium P, which has been conveyed to the nip position NP, between the heating roller 92 and the pressing roller 44. The heating roller 92 starts rotating with the recording medium P sandwiched between the heating roller 92 and the pressing roller 44 to convey the recording medium P.

The heating roller 92 may start moving from the separated position to the contact position before holding of the leading end of the recording medium P by the gripper 36 is released as long as sandwiching of the recording medium P by the heating roller 92 and the pressing roller 44 is completed after releasing of holding of the leading end of the recording medium P by the gripper 36.

As described above, the fixing device 90 is configured to fix the ink image transferred to the recording medium P onto the recording medium P by heating and pressing the recording medium P while the recording medium P is being conveyed and sandwiched by the heating roller 92 and the pressing roller 44.

<Transfer Body 50>

Figure 5:
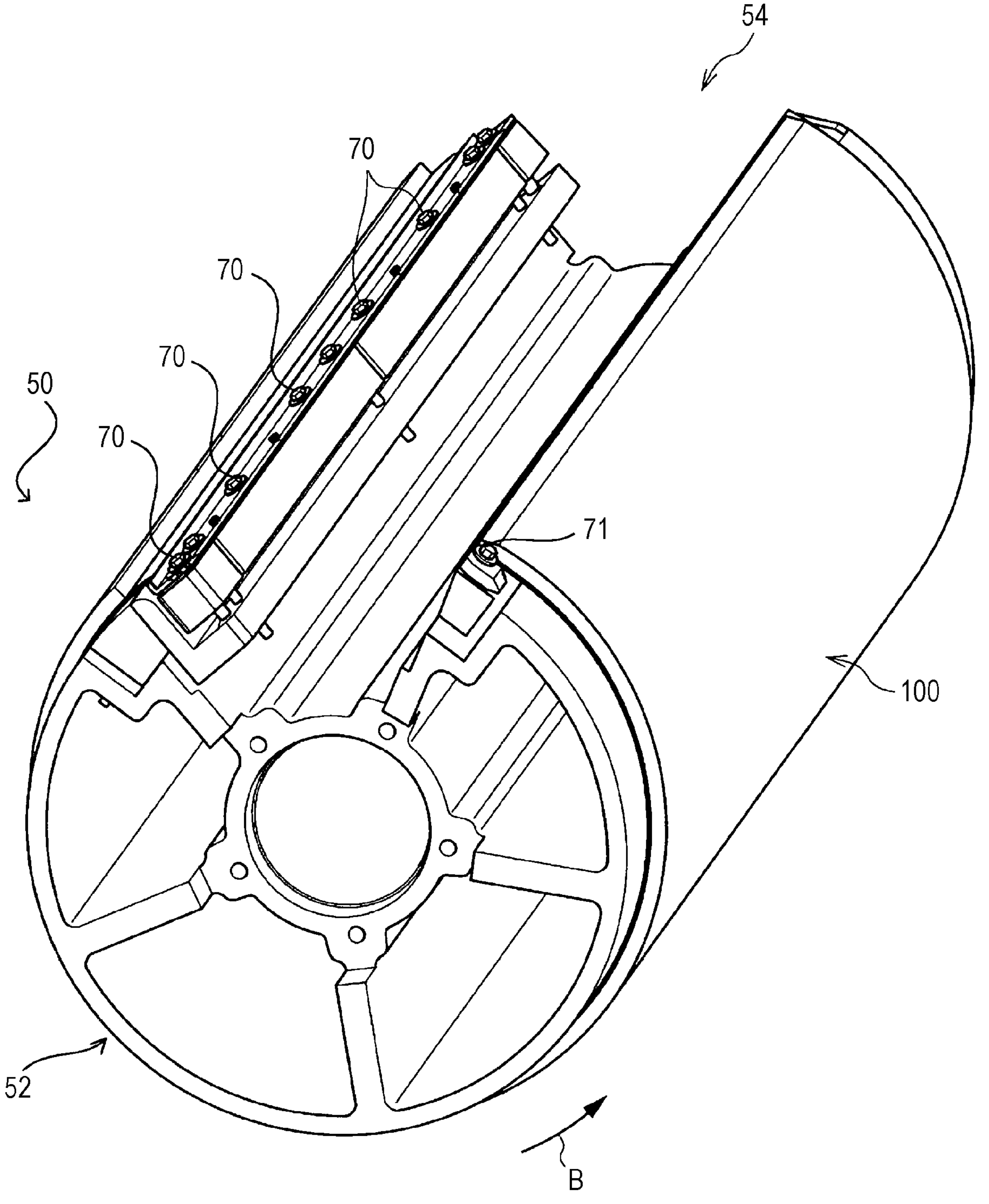
FIG. 5 is a perspective view of a transfer body 50 according to one embodiment of the present invention.

Next, the transfer body 50 will be described. FIG. 5 is a perspective view of the transfer body 50, and FIG. 6 is a cross-sectional view of the transfer body 50.

Figure 6:
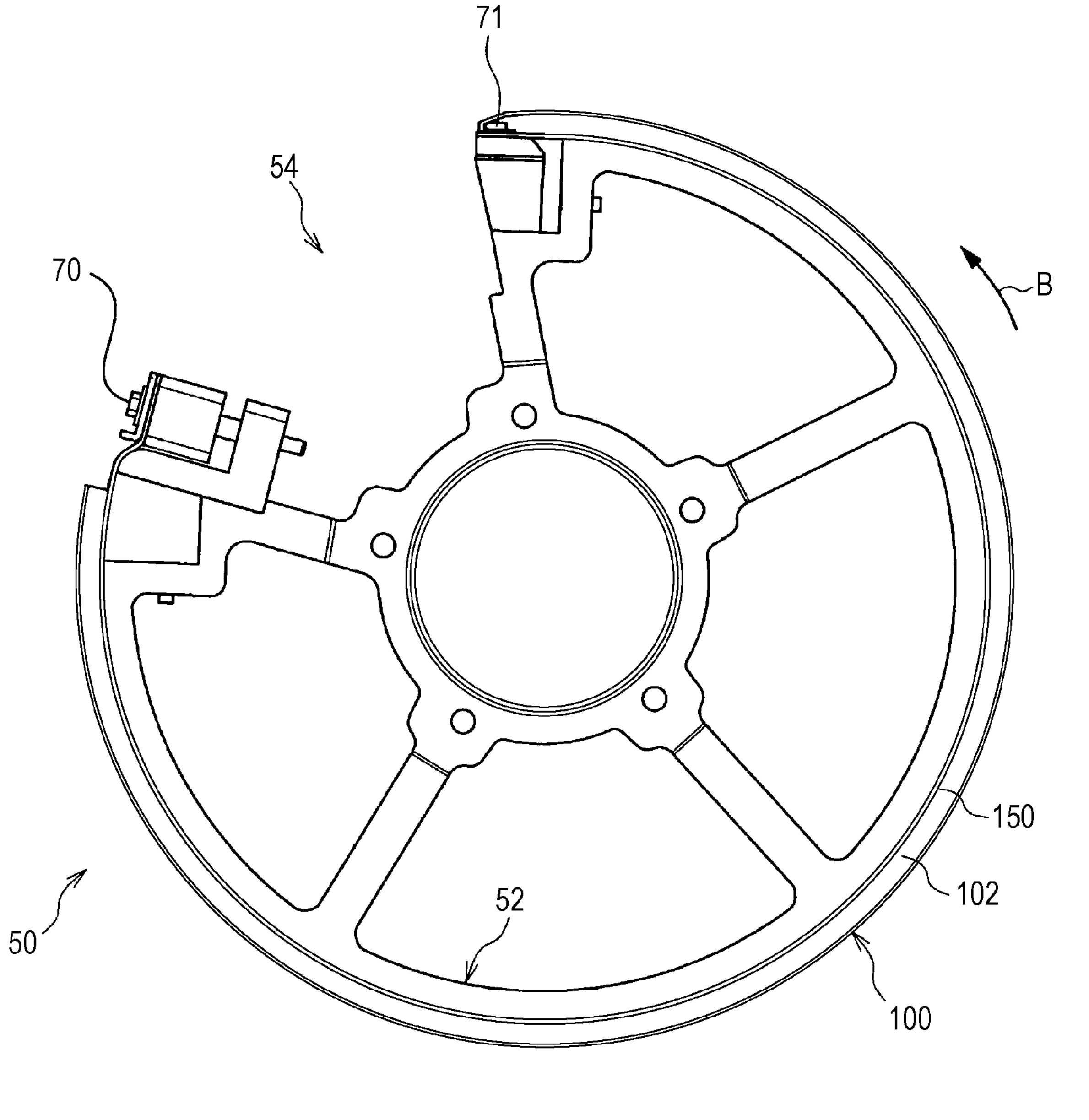
FIG. 6 is a cross-sectional view of the transfer body 50 according to one embodiment of the present invention.

As illustrated in FIGS. 5 and 6, the transfer body 50 as an example of a body member includes a body part 52, and a sheet member 100 that has a sheet-like form wrapped around the body part 52. Hereinafter, the axial direction, the radial direction, and the circumferential direction of the body part 52 may be simply referred to as "axial direction", "radial direction", and "circumferential direction", respectively.

Hereinafter, the upstream in the rotational direction (the direction indicated by the arrow B) of the transfer body 50 may be simply referred to as "upstream", and the downstream in the rotational direction (the direction indicated by the arrow B) of the transfer body 50 may be simply referred to as "downstream". When the circumferential direction and the axial direction are used in the description of the sheet member 100, those directions are along the sheet member 100 wrapped around the body part 52. A direction along a short side of the sheet member 100 having a rectangular shape in a plan view is referred to as a width direction, and a direction along a long side is referred to as a length direction.

At a portion regarding the circumferential direction of the body part 52, a single recess 54 is provided along the axial direction of the body part 52. The cross-sectional shape of the body part 52 is substantially circular, specifically, the outer profile of the cross-section perpendicular to the axial direction is substantial circular. The recess 54 as an example of a recessed portion has a depth along the radial direction of the body part 52. The body part 52 is made of a metal material such as stainless steel and aluminum. In the embodiment, the depth direction of the recess 54 is the same as the radial direction. It is not necessary that the depth direction is the same as the radial direction. The depth direction may be inclined by, for example, about 5° to 10° from the radial direction.

The body part 52 has the length along the axial direction of the body part 52 longer than the width of the sheet member 100 along the axial direction of the sheet member 100. The sheet member 100 is wrapped so as the central portion, in the width direction, of the sheet member 100 overlaps the central portion, in the axial direction, of the body part 52. The width of the sheet member 100 is larger than the maximum width of the recording medium P (see FIG. 4).

The term "sheet-like" refers to a form of paper, a thin plate, or the like and having a thickness allowing deformation along the outer circumference of the body part 52. The length of the sheet member 100 in the circumferential direction (length direction) is substantially the same as the circumferential length of the body part 52 not including the recess 54.

As illustrated in FIG. 6, the sheet member 100 includes a metal layer 150 that is wrapped to make contact with the outer circumferential surface of the body part 52, and an outer layer 102 that is laminated on and bonded to the outer circumferential surface of the metal layer 150.

The metal layer 150 of the embodiment is made of a metal material such as stainless steel, aluminum, and copper. The thickness of the metal layer 150 of the embodiment is, for example, 0.1 mm.

As the outer layer 102 of the embodiment, a solid rubber-based material such as nitrile rubber, chloroprene rubber, ethylene propylene diene rubber, acrylonitrile butadiene rubber, and silicon rubber and a conductive resin material such as polyimide, polyamideimide, polyurethane, polyethylene, and a mixture thereof are used. The thickness of the outer layer 102 of the embodiment is larger than the thickness of the metal layer 150, and is, for example, 7.0 mm.

In the embodiment, one end of the sheet member 100 is fixed to the body part 52 by a mounting screw 71, and the other end of the sheet member 100 is fixed by a fixing screw 70. Therefore, the sheet member 10 is easily attached to and detached from the body part 52.

Figure 7:
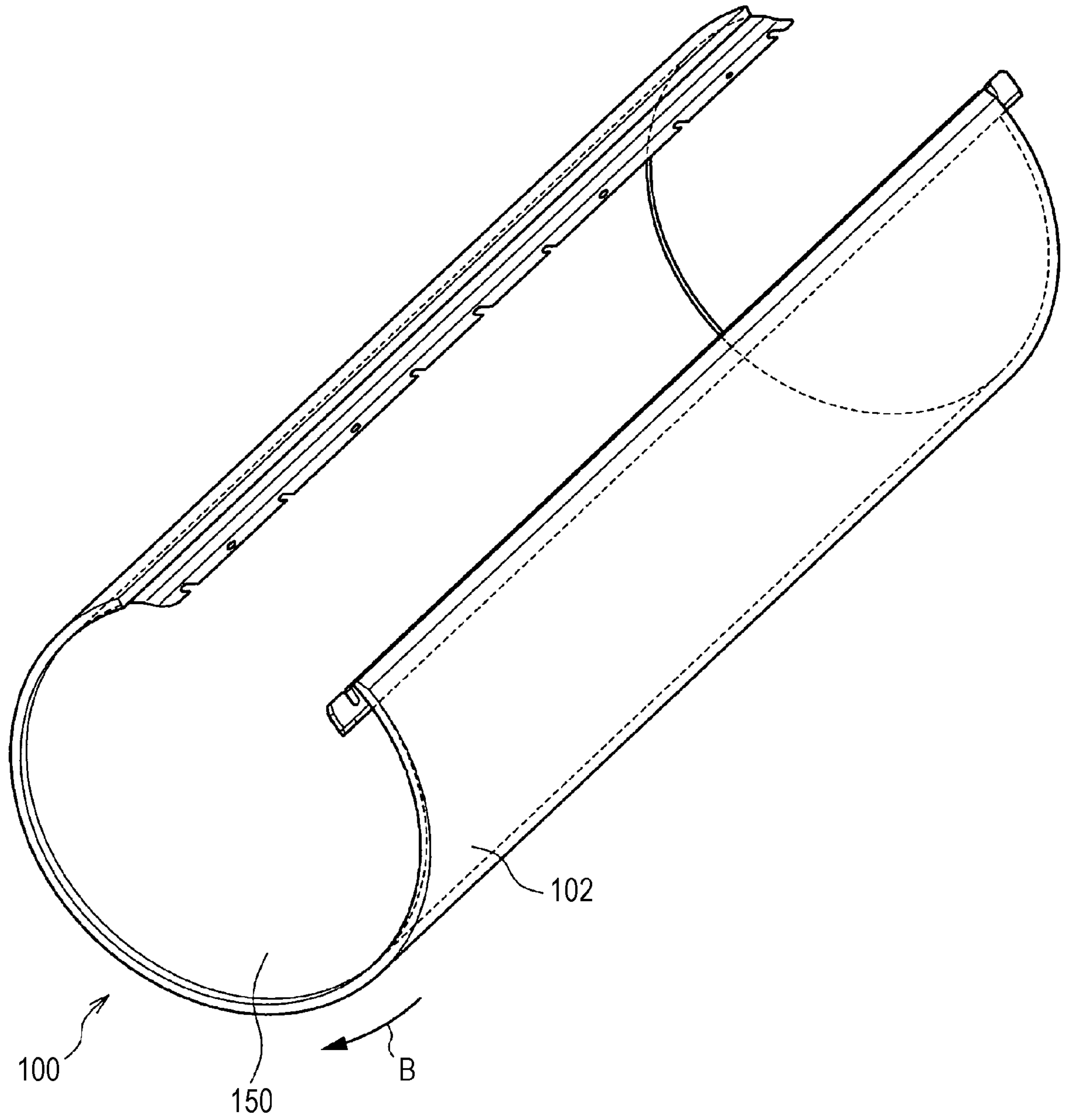
FIG. 7 is a perspective view of a sheet member 100 according to one embodiment of the present invention.
Figure 8:
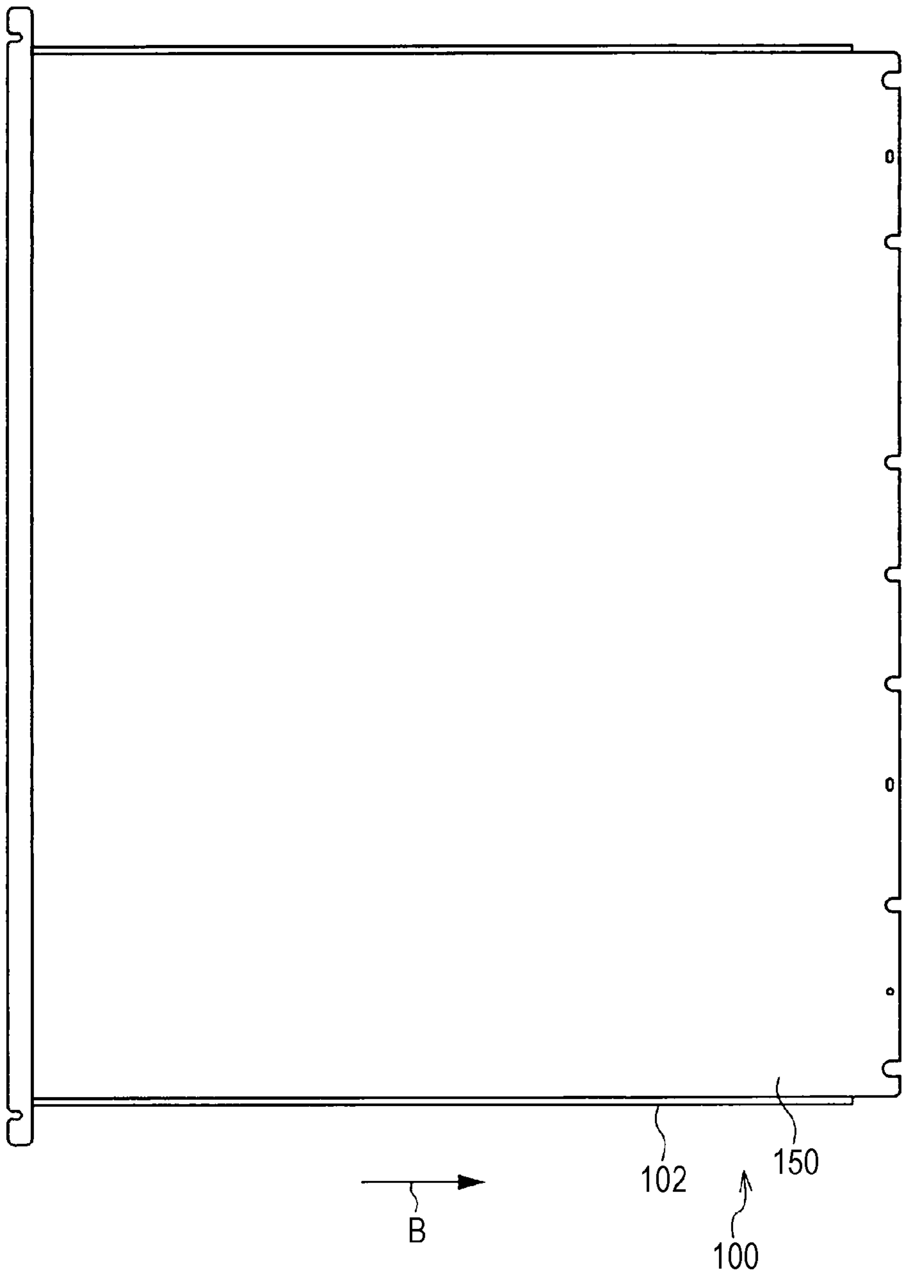
FIG. 8 is a plan view of a sheet member 100 according to one embodiment of the present invention as viewed from a metal layer 150 side.

FIG. 7 is a perspective view of the sheet member 100 that has been detached from the body part 52. FIG. 8 is a plan view of the sheet member 100 of the embodiment as viewed from the metal layer 150 side.

Figure 9:
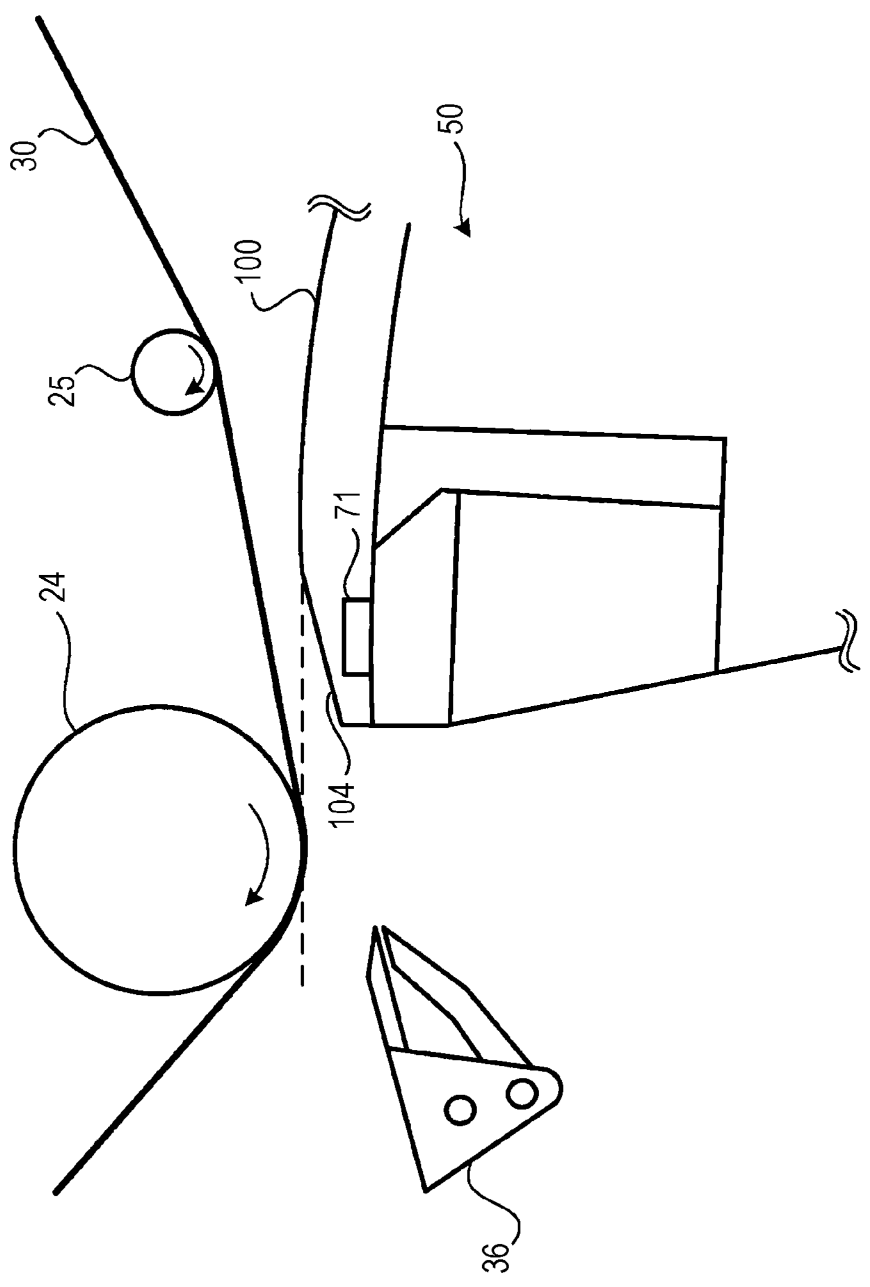
FIG. 9 is an enlarged view of a front end side in a rotational direction of the transfer body 50.

FIG. 9 is an enlarged view of the front end side in the rotational direction of the transfer body 50. Referring to FIG. 9, a tapered surface 104 that is a slope surface of which distance to the rotational center increases toward the downstream side in the rotational direction is provided on the leading end of the transfer body 50, the leading end being on the front end side, in the rotational direction, of a portion of the outer circumference not including a portion where the recess 54 is provided. As described above, since the transfer body 50 includes the body part 52 including the recess 54 provided along the direction substantially orthogonal to the rotational direction, and the sheet member 100 wrapped around the body part 52, the tapered surface 104 is provided on the leading end, which is on the front end side regarding the rotational direction, of the sheet member 100.

Figure 10:
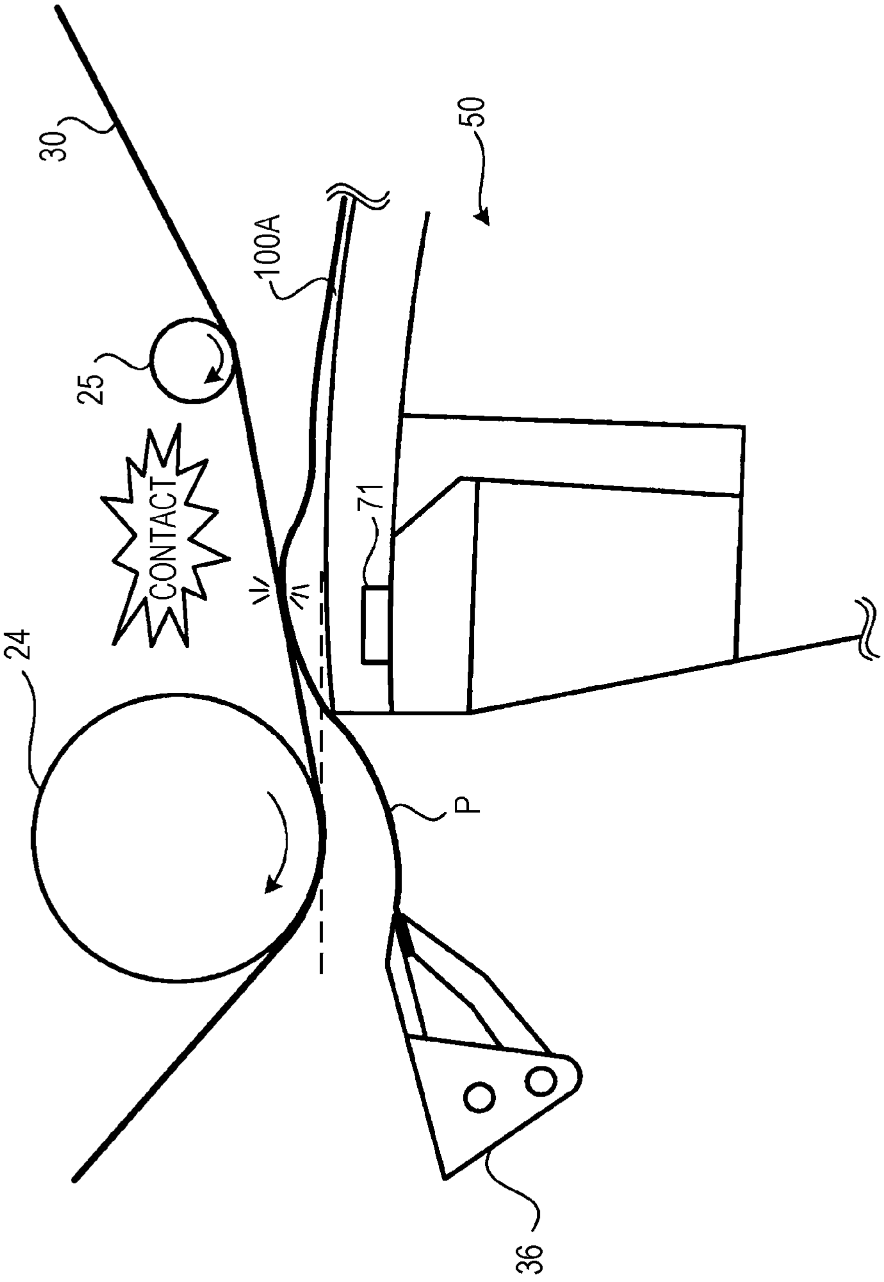
FIG. 10 is a view illustrating an example state of a recording medium P where a sheet member 100A provided with no tapered surface 104 is used.

Since the sheet member 100 is provided with the tapered surface 104, lifting of the recording medium P from the transfer body 50 is suppressed. FIG. 10 illustrates an assumed example state of the recording medium P where the sheet member 100A provided with no tapered surface 104 is used.

Referring to FIG. 10, the recording medium P gripped by the gripper 36 is pushed up by the leading end of the sheet member 100A to cause lifting, and contacts the transfer belt 30 by a portion which is not yet arrived at the normal transfer position.

Figure 11:
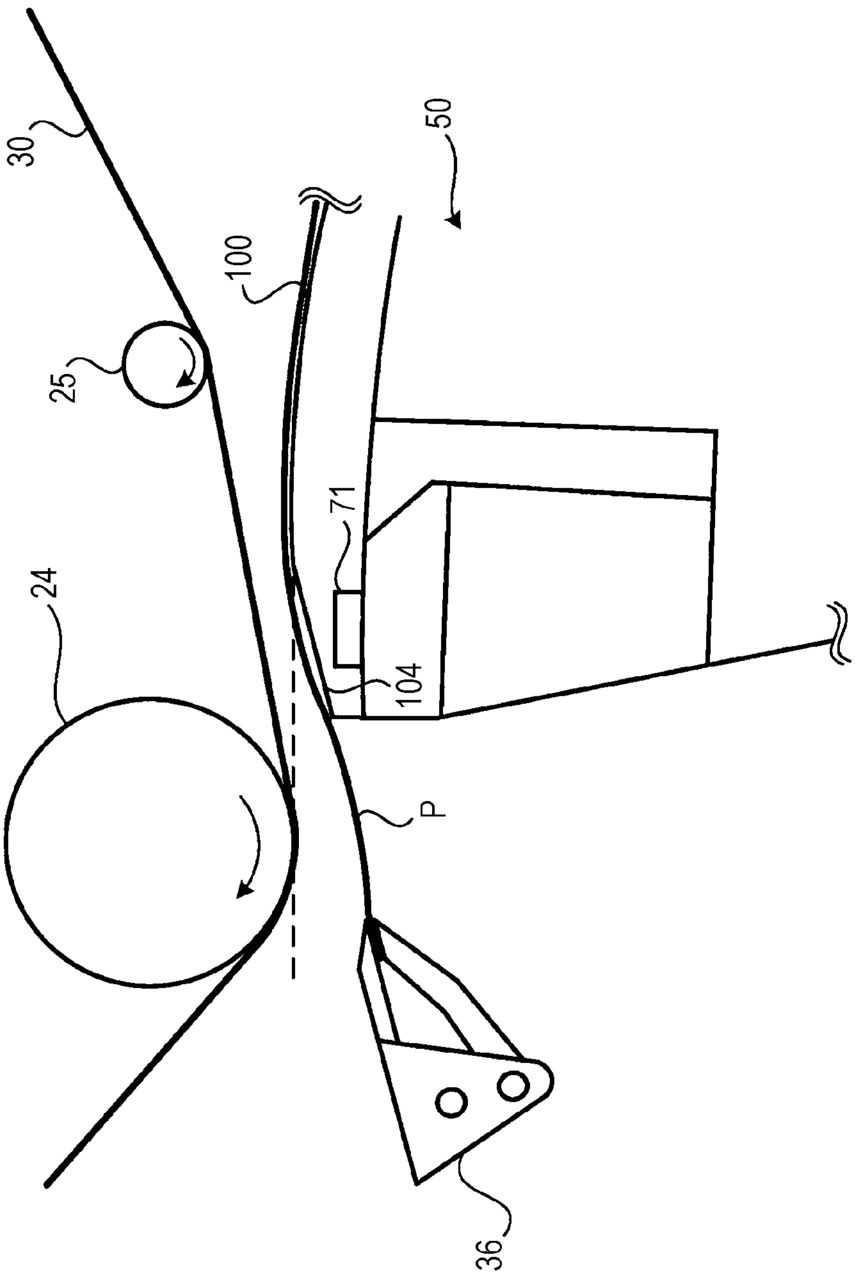
FIG. 11 is a view illustrating an example state of the recording medium P where the sheet member 100 provided with a tapered surface 104 is used.

In contrast, FIG. 11 illustrates an example state of the recording medium P where the sheet member 100 provided with the tapered surface 104 is used.

Referring to FIG. 11, lifting is suppressed since the recording medium P gripped by the gripper 36 is not pushed up by the leading end of the sheet member 100, and this prevents the recording medium P from contacting the transfer belt 30 by an unintended portion.

It is more preferable that the relationship among the position of the gripper 36, the orientation of the gripping surface with which the gripper 36 grips the recording medium P, and the slope angle of the tapered surface 104 provided on the sheet member 100 satisfies a specific condition.

Figure 12:
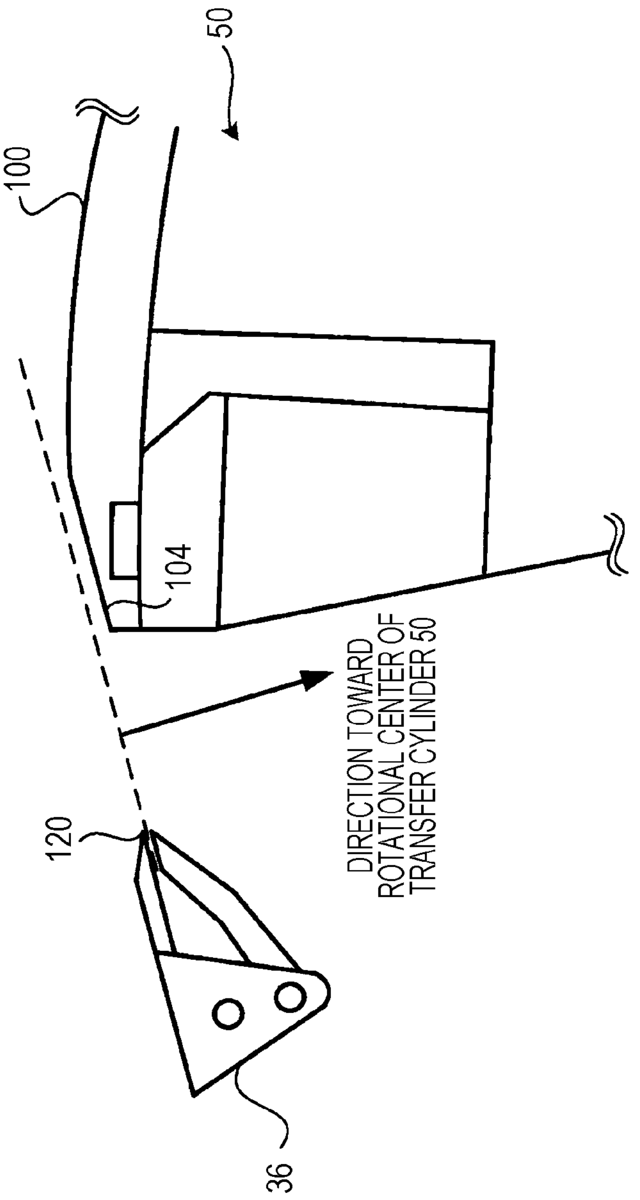
FIG. 12 is a view for explaining a relationship between the tapered surface 104 and a gripping surface 120 with which the gripper 36 grips the recording medium P.

Specifically, it is preferable that, as illustrated in FIG. 12, in a state where the gripper 36 is accommodated in the recess 54, the tapered surface 104 is positioned closer to the rotational center of the transfer body 50 than a plane including the gripping surface 120 with which the gripper 36 grips the recording medium P.

Figure 13:
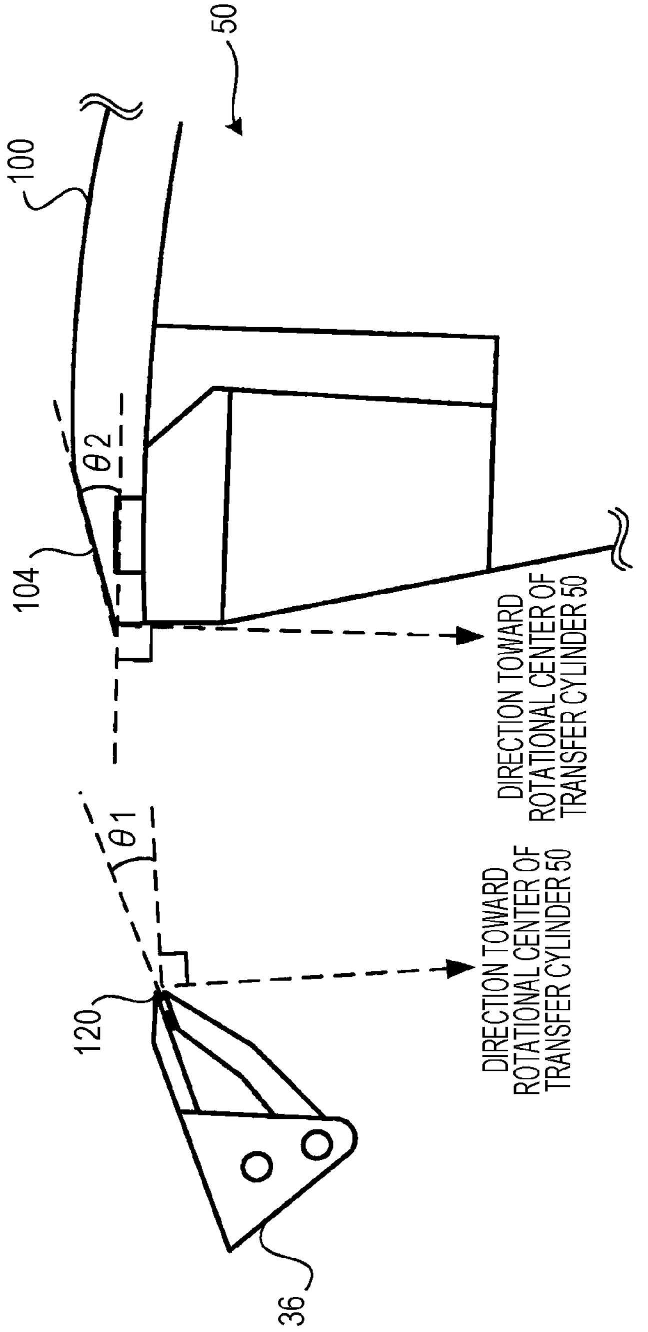
FIG. 13 is a view for explaining a relationship between an angle θ1 and an angle θ2, the angle θ1 being an angle between the gripping surface 120 with which the gripper 36 grips the recording medium P and a plane orthogonally intersecting, at a distal end of the gripper 36, a line extending from the distal end of the gripper 36 toward a rotational center of the transfer body 50, the angle θ2 being an angle between the tapered surface 104 and a plane orthogonally intersecting, at a leading end of the tapered surface 104, a line extending from the leading end of the tapered surface 104 toward the rotational center of the transfer body 50.

Furthermore, as illustrated in FIG. 13, it is preferable that an angle θ2 is smaller than an angle θ1, where the angle θ1 is an angle between the gripping surface 120 with which the gripper 36 grips the recording medium P and a plane orthogonally intersecting, at a distal end of the gripper 36, a line extending from the distal end of the gripper 36 toward the rotational center of the transfer body 50, and the angle θ2 is an angle between the tapered surface 104 and a plane orthogonally intersecting, at a leading end of the tapered surface 104, a line extending from the leading end of the tapered surface 104 toward the rotational center of the transfer body 50. That is, when it is configured to satisfy $\theta 2<\theta 1$, the recording medium P gripped by the gripper 36 is more likely to be above the tapered surface 104. As a result, the recording medium P being pushed up by the transfer body 50 is prevented, which suppresses lifting of the recording medium P from the transfer body 50.

As described above, it is more preferable that $\theta 2<\theta 1$ is satisfied, that is, the difference between the two angles, $\theta 2-\theta 1$, takes a negative value instead of 0.

However, setting the angle θ1 of the gripping surface 120 of the gripper 36 too large may not be good for some cases, and setting the angle θ2, which is the slope angle of the tapered surface 104, too small increases a leading end margin which is a region starting from the front end of the recording medium P and in which no image is formed.

In this regard, the image shift amount was evaluated for cases with varied relationship between the angle θ1 of the gripping surface 120 of the gripper 36 and the angle θ2 which is the slope angle of the tapered surface 104. Results of evaluation are shown in FIG. 14.

Specifically, an image of a thin line having a width of two dots was formed in a direction orthogonal to the conveyance direction of the recording medium P, and was evaluated based on to what degree the width of the thin line has broadened. If there is no image shift, the width of the thin line image remains as it is, but when any image shift amount occurs, the width of the thin line broadens. Whether the broadened width of a thin line image is within an allowable range was evaluated.

Based on the results of evaluation, cases in which the angle difference of θ2−θ1 is in a range from −12° to 0° showed good evaluation result. That is, by setting θ2−θ1, which is the difference between the angle θ1 of the gripping surface 120 of the gripper 36 and the angle θ2 which is the slope angle of the tapered surface 104, to be in a range from −12° to 0°, lifting of the recording medium P from the body part 50 is suppressed, and the image shift amount falls within the allowable range.

Note that, the difference between the two angles, θ2−θ1, being in a range from −16° to 4° may be allowed depending on the balance between the amount of the leading end margin and the quality of the formed image.

Figure 15:
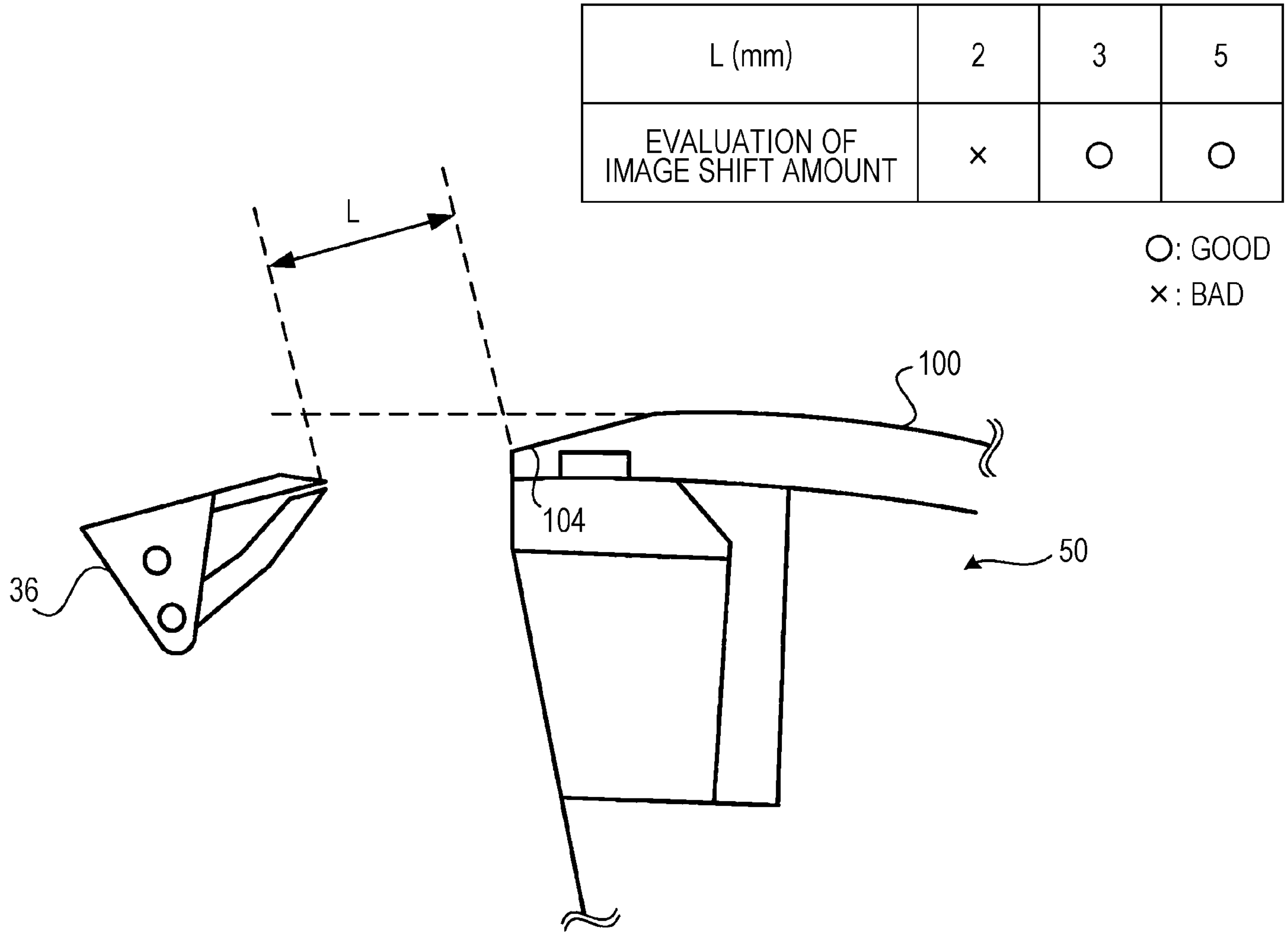
FIG. 15 is a figure for explaining a distance L between the leading end of the sheet member 100 and the distal end of the gripper 36.

Furthermore, as illustrated in FIG. 15, it is more preferable that a distance L between the leading end, which is on the front end side in the rotational direction, of the sheet member 100 and the distal end of the region, in which the recording medium P is gripped, of the gripper 36 is equal to or more than 3 mm. However, there is a limit for how far the gripper 36 is positioned from the transfer body 50, because positioning the gripper 36 far from the leading end of the transfer body 50 increases the leading end margin that starts from the front end of the recording medium P and in which no image is formed.

In this regard, the distance L between the distal end of the gripper 36 and the leading end of the tapered surface 104 was varied to evaluate the image shift amount. The evaluation results are shown in FIG. 15. The evaluation method for obtaining the evaluation results shown in FIG. 15 is the same as the evaluation method for obtaining the evaluation results shown in FIG. 14.

The evaluation results show that the image shift amount is within the allowable range when the distance L is equal to or more than 3 mm, and the image shift amount is out of the allowable range when the distance L is 2 mm. As described above, positioning the gripper 36 to be far separated with too large distance L results in an increase in the leading end margin.

Figure 16:
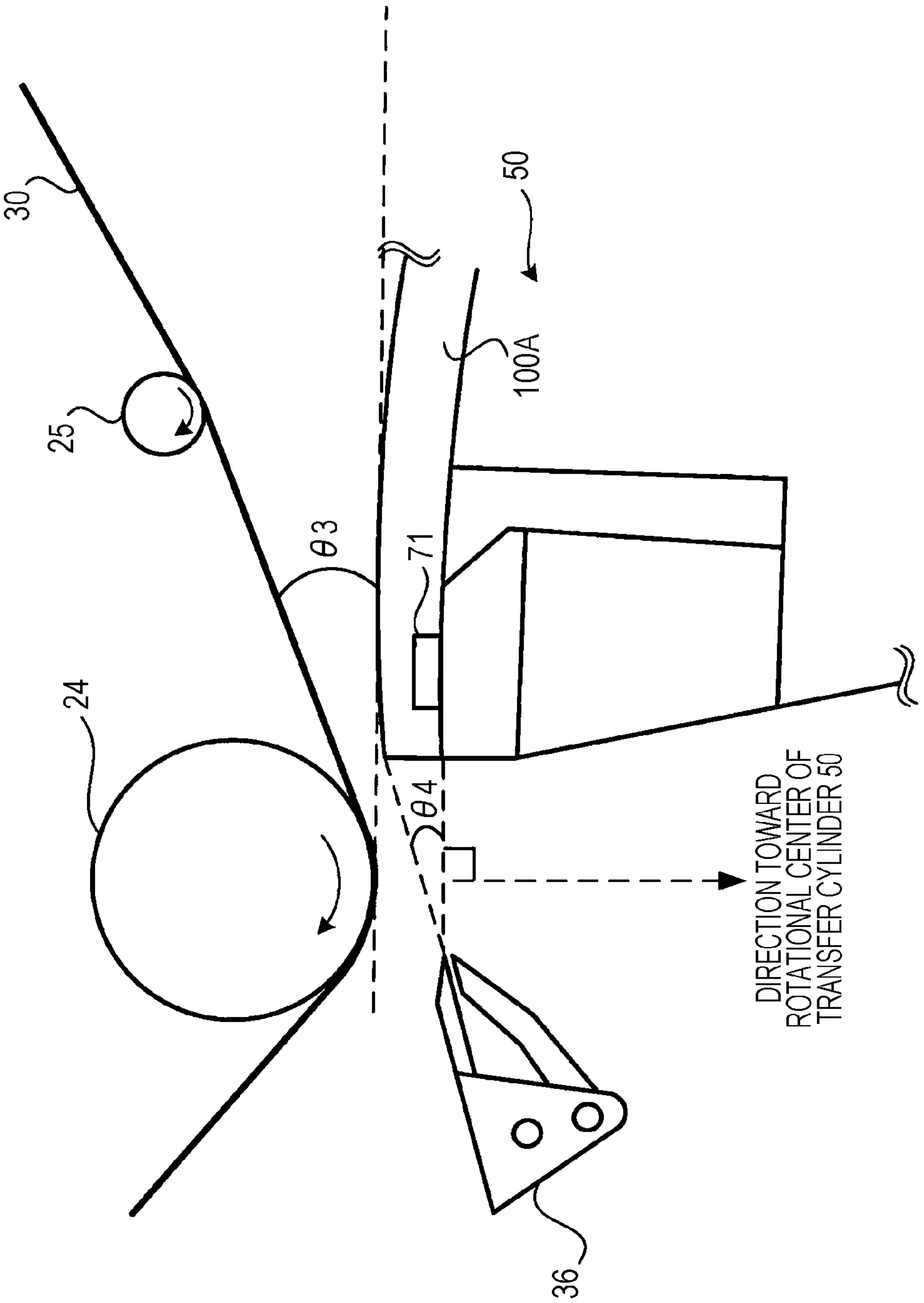
FIG. 16 is a figure illustrating a state in which the set position of a support roller 25 is adjusted to set an angle θ3 to be larger than an angle θ4.

Note that, even when the recording medium P is lifted from the transfer body 50, no image shift will occur if the recording medium P does not contact the transfer belt 30. Thus, as illustrated in FIG. 16, it is better to adjust the installation position of the support roller 25 so as an angle θ3 between the transfer belt 30, which is between the opposing roller 24 and the support roller 25, and a horizontal plane to be larger than an angle θ4 between a line connecting the distal end of the gripper 36 and the leading end of the sheet member 100A and a plane orthogonally intersecting, at the distal end of the gripper 36, a line extending from the distal end of the gripper 36 to the rotational center of the transfer body 50.

Figure 17:
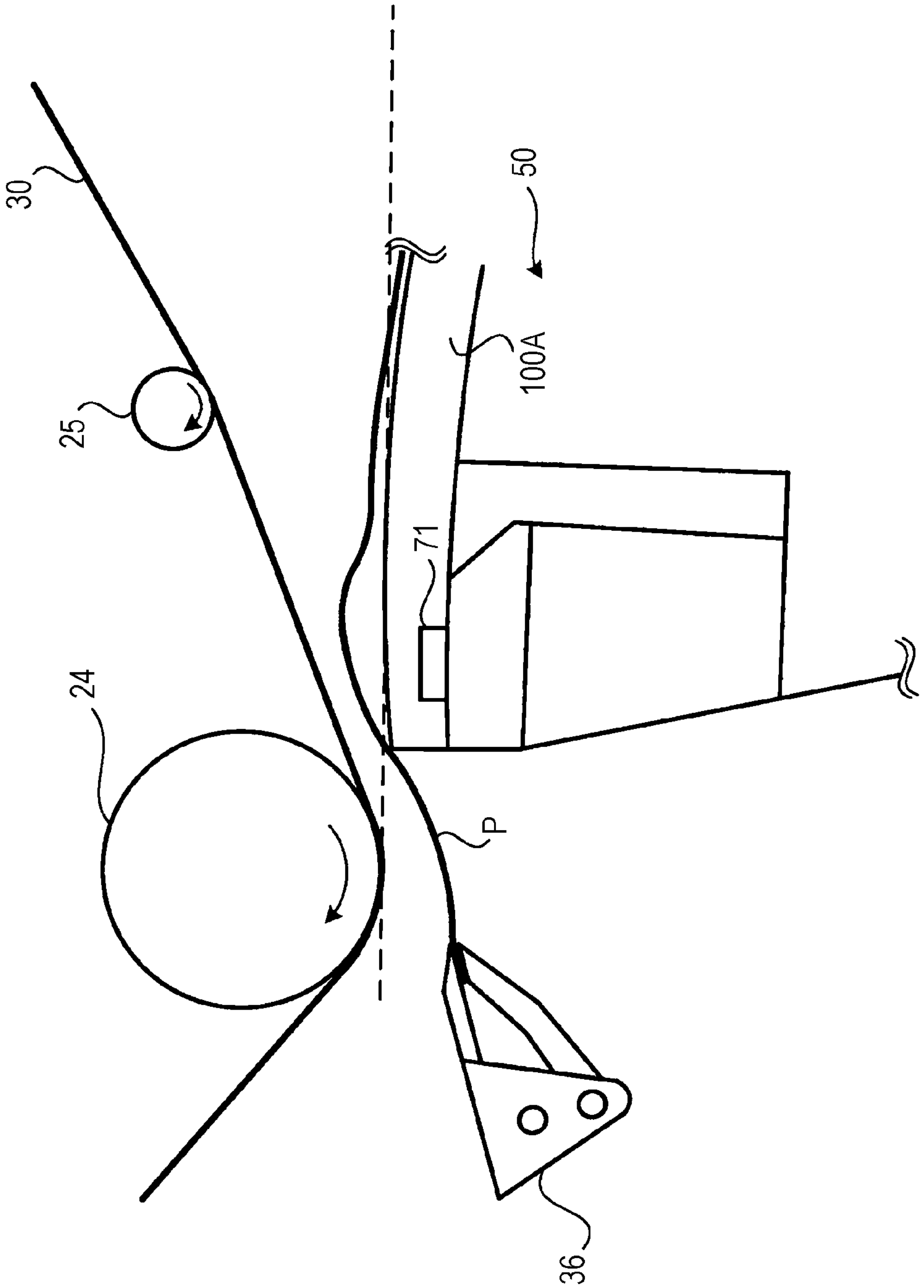
FIG. 17 is a figure illustrating an example state of the recording medium P where θ4<θ3.

FIG. 17 illustrates an example state of the recording medium P where θ4<θ3 is satisfied as described above. By positioning the support roller 25 so as to satisfy θ4<θ3, as illustrated in FIG. 17, even when the recording medium P is pushed up by the leading end of the sheet member 100A and lifted from the transfer body 50, the recording medium P contacting the transfer belt 30 at an unintended portion is prevented.

Providing the sheet member 100 with the tapered surface 104 also has an effect of reducing the impact given by the opposing roller 24 making contact with the transfer body 50 at the transfer position. However, there are limits for the distance and a slope of the tapered surface 104, because when the tapered surface 104 provided to the sheet member 100 is given a moderate slope which thereby gives a long distance, the leading end margin starting from the front end of the recording medium P and in which no image is formed increases.

In this regard, lifting of the recording medium P from the transfer body 50 may be suppressed not only by providing the tapered surface 104 on a surface at the front end in the rotational direction of the transfer body 50 but also by employing a configuration described below.

Figure 18:
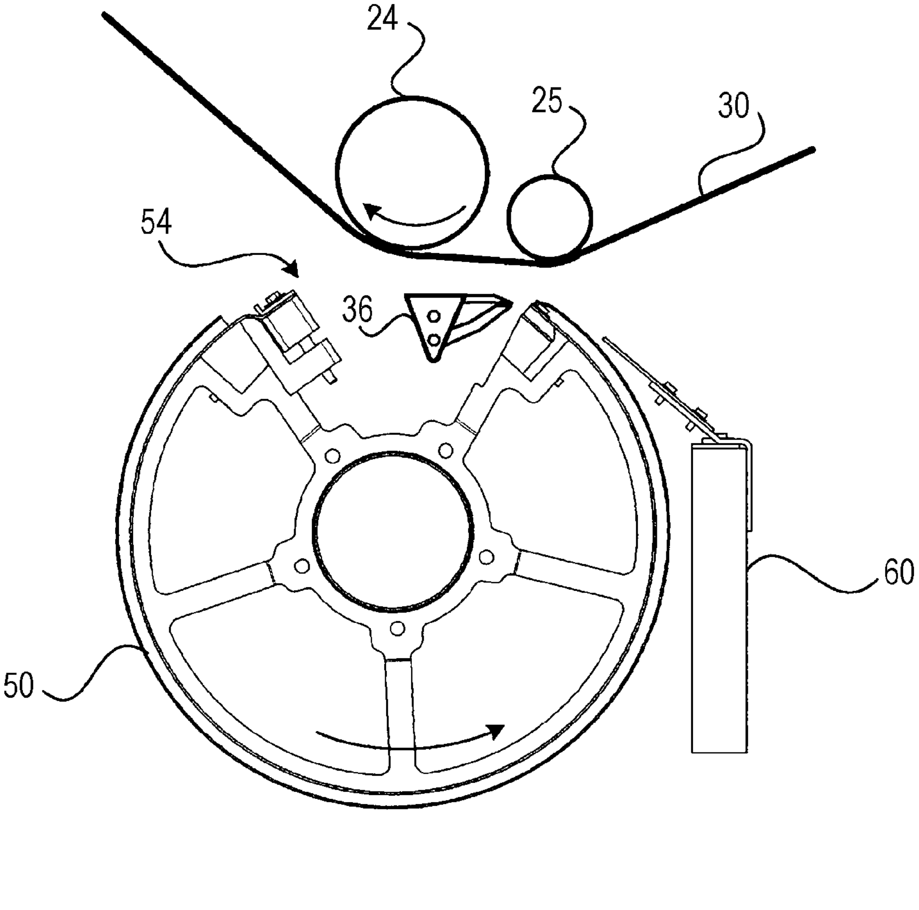
FIG. 18 is a view illustrating an enlarged transfer position at which an image on a transfer belt 30 is transferred to a recording medium P and the surroundings of the transfer position.

FIG. 18 is a view illustrating the transfer position at which an image on the transfer belt 30 is transferred to the recording medium P and the surroundings of the transfer position, where the transfer body 50 and the opposing roller 24 are close to each other.

FIG. 18 illustrates the transfer body 50 rotating with the gripper 36 accommodated in the recess 54. It can be understood that the sliding member 60 is disposed close to the transfer body 50 on the downstream side of the transfer position in the rotational direction.

Figure 19:
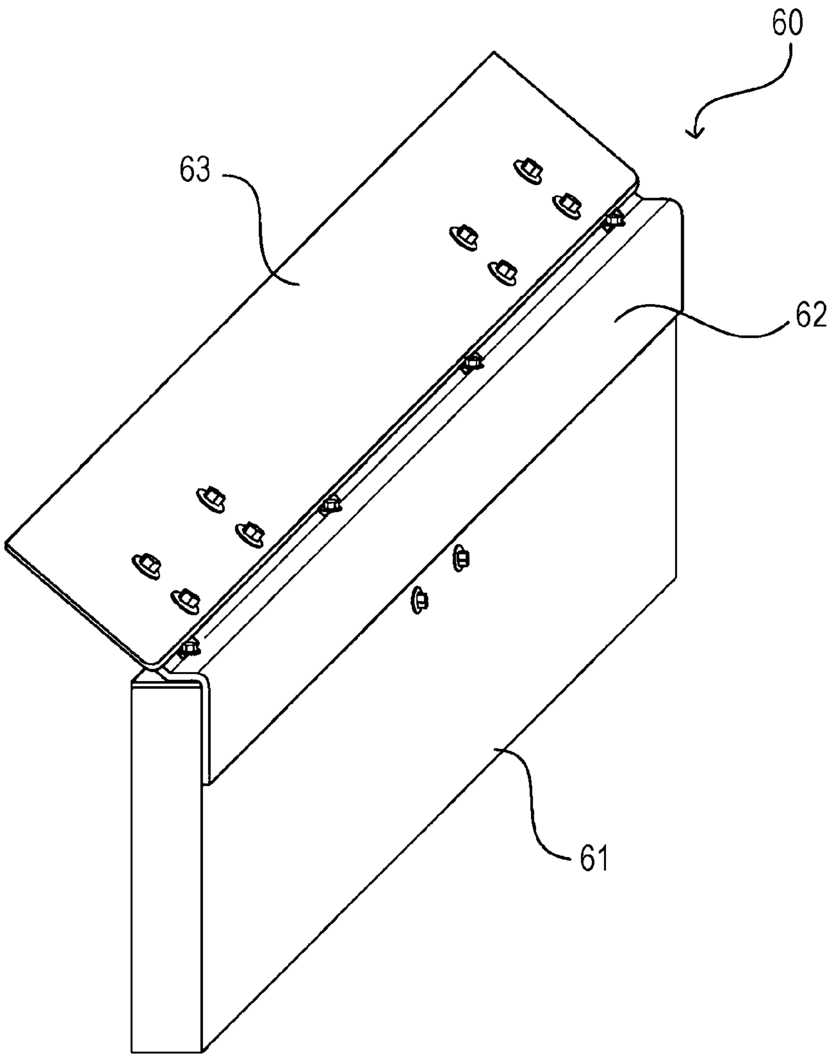
FIG. 19 is a perspective view of a sliding member 60 illustrated in FIG. 9.

FIG. 19 is a perspective view of the sliding member 60. Referring to FIG. 19, the sliding member 60 includes a main body 61, a fixing attachment 62, and a plate part 63. The plate part 63 is a member that contacts the recording medium P that is being conveyed to apply a conveyance load to the recording medium P, and is fixed to the fixing attachment 62 with screws or the like. With the fixing attachment 62 fixed to the main body 61 with screws or the like, the plate part 63 is fixed to the main body 61 via the fixing attachment 62.

The plate part 63 is a member that directly contacts the recording medium P that is being conveyed, and includes, for example, a material made of rubber or the like having a coefficient of friction of 1.0 or more and 1.5 or less against the recording medium P. The material constituting the plate part 63 is not limited to rubbers, and other materials such as resin materials and metal materials can be used.

Now, why a conveyance load is applied, by the sliding member 60, to the recording medium P being conveyed will be described.

Figure 20:
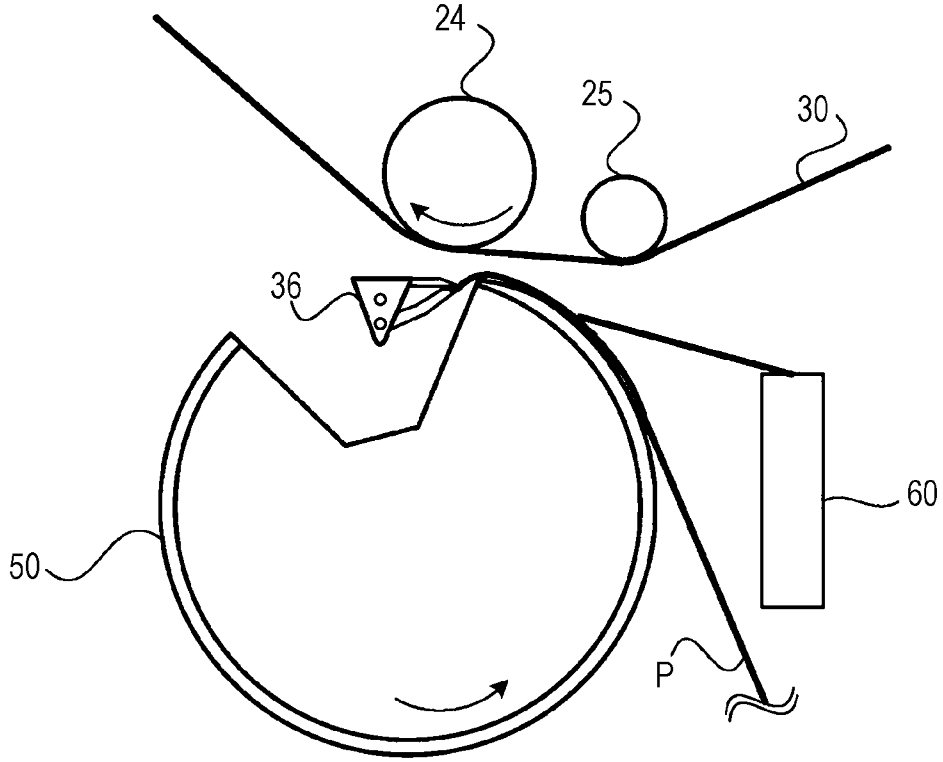
FIG. 20 is a figure illustrating an example state of the recording medium P where the sliding member 60 is provided.

FIG. 20 illustrates an example in which the sliding member 60 is provided and a conveyance load is applied to the recording medium P being conveyed. Referring to FIG. 20, it can be understood that the recording medium P is pulled toward the downstream side in the conveyance direction by the recording medium P gripped by the gripper 36 and the sliding member 60 sliding against each other, and thereby lifting of the recording medium P is suppressed. In particular, in the image forming apparatus 10 of the embodiment, the recording medium P is conveyed with the leading end of the recording medium P being gripped by the gripper 36, so that the effect of suppressing the lifting of the recording medium P by pulling the recording medium P toward the downstream side in the conveyance direction is significant.

Note that, since the sliding member 60 of the embodiment has a form of a plate, the effect of suppressing the lifting of the recording medium P varies by adjusting the distance between the distal end of the sliding member 60 and the opposing roller 24 and the distance between the distal end of the sliding member 60 and the surface of the transfer body 50.

Specifically, the effect of suppressing the lifting is greater for a shorter distance between the distal end of the sliding member 60 and the opposing roller 24. However, when the sliding member 60 is positioned so close to the opposing roller 24, the possibility of the sliding member 60 contacting the transfer belt 30 increases. A shorter distance between the distal end of the sliding member 60 and the surface of the transfer body 50 gives a larger conveyance resistance applied to the recording medium P and enables applying a conveyance resistance also to a thin recording medium P.

For example, the effect of suppressing the lifting of the recording medium P from the transfer body 50 can be obtained by positioning the distal end of the sliding member 60 so as a distance A from the center of the opposing roller 24 to be equal to or less than 50 mm and a distance B from the surface of the transfer body 50 to be equal to or less than 2 mm.

To reliably apply a conveyance resistance to the recording medium P being conveyed, that is, to apply a conveyance resistance to the recording medium P being conveyed regardless of the thickness of the recording medium P, the sliding member 60 may be positioned so as to contact the surface of the transfer body 50. However, in such a position, ink absorbing particles and the like adhering to the transfer body 50 may adhere to the sliding member 60, which may smear the recording medium P that is being conveyed. Moreover, the sliding member 60 and the transfer body 50 that are always in contact with each other wear and may deteriorate quickly.

In consideration of smearing of an image transferred onto the recording medium P deterioration of the transfer body 50 and the sliding member 60 due to wearing, and an effect of the recording medium P that is being conveyed receiving a conveyance resistance, it is preferable that the sliding member 60 is disposed so as not to contact the transfer body 50.

Described above is the configuration in which a conveyance load is applied, by the plate-shaped sliding member 60, to the recording medium P that is being conveyed by the conveyance unit 14. However, a conveyance load may be applied to the recording medium P by other configurations.

Figure 21:
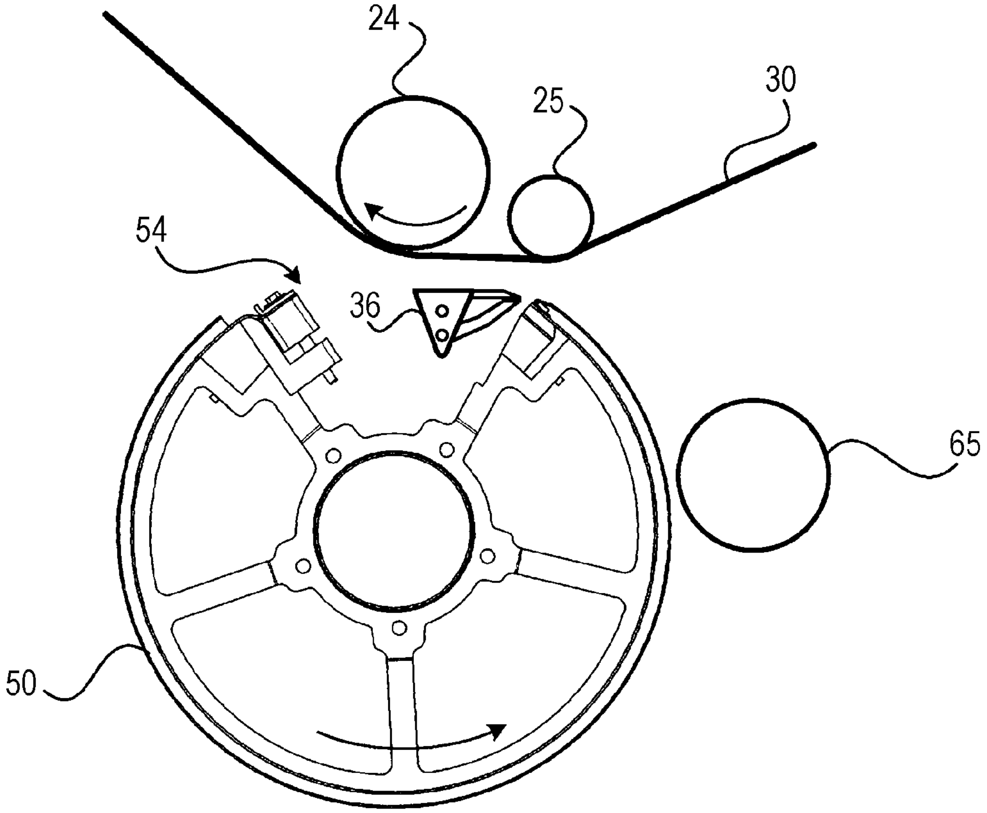
FIG. 21 is a figure for explaining a configuration in which a conveyance load is applied to the recording medium P by a roller 65.

For example, as illustrated in FIG. 21, a conveyance load may be applied to the recording medium P by a roller 65 which is a rotating member that is positioned close to the surface of the transfer body 50 without contact and rotates while making contact with the recording medium P that is conveyed.

The roller 65 may be a rotating member that rotates by making contact with the surface of the transfer body 50.

The roller 65 may be a driven roller that is rotated by a frictional force produced against the surface of the transfer body 50 or the recording medium P, or may be a driving roller driven by an external driving force. Note that, when the roller 65 is driven, the roller 65 will rotate at a surface speed lower than the surface speed of the transfer body 50.

Note that, when applying a conveyance load to the recording medium P by the roller 65, the effect of suppressing the lifting of the recording medium P from the transfer body 50 can also be obtained by positioning the roller 65 so as the distance between the center of the roller 65 and the center of the opposing roller 24 to be equal to or less than 50 mm and the distance between the surface of the roller 65 and the surface of the transfer body 50 to be equal to or less than 2 mm.

Similar to the sliding member 60 described above, the member constituting the roller 65 may include, for example, a material made of rubber or the like having a coefficient of friction of 1.0 or more and 1.5 or less against the recording medium P. The material of the roller 65 is not limited to rubbers, and other materials such as resin materials and metal materials may be used.

Note that, a sufficient conveyance load as described above may not be applied to the recording medium P due to various restrictions in a real configuration of apparatus.

Thus, to improve the overall quality of an image formed on the recording medium P, the above-described configuration in which the tapered surface 104 is provided on the leading end of the sheet member 100 and the above-described configuration in which a conveyance load is applied to the recording medium P by the sliding member 60 or the like are combined to suppress lifting of the recording medium P from the transfer body 50 while preventing enlarging of the leading end margin.

<Another Image Forming Apparatus>

Figure 22:
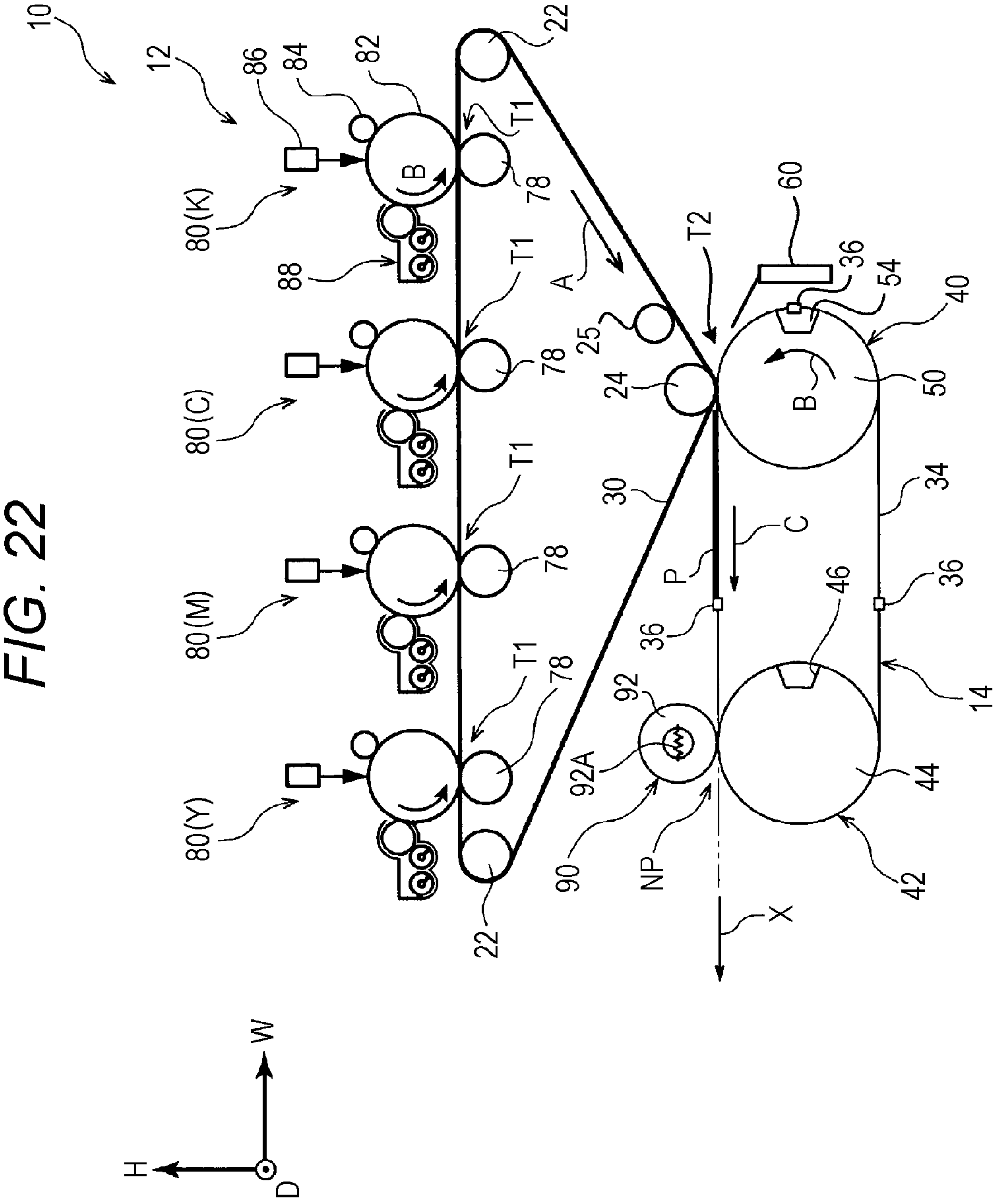
FIG. 22 is a schematic diagram illustrating a configuration of another image forming apparatus 10 according to one embodiment of the present invention.

FIG. 22 is a schematic diagram illustrating a configuration of another image forming apparatus 10 according to one embodiment of the present invention. The image forming apparatus 10 according to the embodiment is not limited to an inkjet type as described above, and may be, for example, an electrophotographic type as illustrated in FIG. 22. That is, instead of the adhesive layer forming device 26, the particle supply device 18, and the discharge head 20, toner-image forming units 80 that form toner images (an example of an image) of respective colors may be provided.

Each of the toner-image forming units 80 (80Y, 80M, 80C, and 80K) for the respective colors includes a photoconductor 82 that has a cylindrical shape and rotates in one direction (the direction indicated by an arrow B). Around each of the photoconductors 82, a charger 84, an exposure device 86, and a developing device 88 are disposed in this order from the upstream side in a rotational direction of the photoconductor 82.

In each of the toner-image forming units 80, the charger 84 charges the surface of the photoconductor 82, and the exposure device 86 exposes the surface of the photoconductor 82 charged by the charging device 84 to light to form an electrostatic latent image on the surface of the photoconductor 82. The developing device 88 develops the electrostatic latent image formed by the exposure device 86 on the surface of the photoconductor 82, and thereby a toner image is formed.

Primary transfer rollers 78 are provided on the inner circumferential surface side of the transfer belt 30, and face the corresponding photoconductors 82 with the transfer belt 30 therebetween. The toner images formed by the toner-image forming units 80 for the respective colors are sequentially and overlappingly transferred, as a primary transfer, to the transfer belt 30 at the respective primary transfer positions T1 where the respective primary transfer rollers 78 are provided. The overlapping toner images are transferred, as a secondary transfer, to the recording medium P at a secondary transfer position T2.

<Others>

Note that, the present invention is not limited to the embodiments described above, and can be modified in design as appropriate without departing from the gist of the present invention.

For example, the body part 52 may have a substantially columnar shape instead of a substantially cylindrical shape. In the embodiment, a toner image is taken as an example of an image and is formed by a dry electrophotographic method. However, the present invention is not limited such a configuration. For example, a toner image may be formed by a wet electrophotographic method.

What is claimed is:

1. An image forming apparatus comprising:

a holding body comprising a belt configured to hold a formed image;

a conveyance unit comprising a gripping portion including a gripper configured to convey a recording medium with a leading end of the recording medium gripped by the gripping portion; and a transfer body including a recessed portion that accommodates the gripping portion and is provided along a direction substantially orthogonal to a rotational direction, configured to sandwich the recording medium conveyed by the conveyance unit between the transfer body and the holding body to transfer an image on the holding body to the recording medium conveyed by the conveyance unit, and including a slope surface provided at a leading end of a portion of an outer circumference not including a portion where the recessed portion is provided, the leading end being on a front end side in the rotational direction, a distance from the slope surface to a rotational center becoming larger toward upstream side in the rotational direction, wherein a second angle is smaller than a first angle, the first angle being an angle between the gripping surface with which the gripping portion grips the recording medium and a plane orthogonally intersecting, at a leading end of the gripping portion, a line extending from the leading end of the gripping portion toward the rotational center of the transfer body, the second angle being an angle between the slope surface and a plane orthogonally intersecting, at a leading end of the slope surface, a line extending from the leading end of the slope surface toward the rotational center of the transfer body.

2. The image forming apparatus according to claim 1, wherein in a state in which the gripping portion is accommodated in the recessed portion, the slope surface is positioned closer to the rotational center of the transfer body than a plane including a gripping surface with which the gripping portion grips the recording medium.

3. The image forming apparatus according to claim 1, wherein a distance between a leading end, which is on a front end side in the rotational direction, of a surface of the transfer body and a distal end of a region of the gripping portion that grips the recording medium is equal to or more than 3 mm.

4. The image forming apparatus according to claim 1, wherein the transfer body includes a body part having a substantially circular cross-sectional shape and including the recessed portion that accommodates the gripping portion and is provided along the direction substantially orthogonal to the rotational direction, and a sheet member wrapped around the body part, and the slope surface is provided on a leading end, which is on a front end side in the rotational direction, of the sheet member, a thickness of the sheet member becoming larger toward the upstream side in the rotational direction to form the slope surface sloping with respect to a plane orthogonal to a direction toward the rotational center of the transfer body.

5. The image forming apparatus according to claim 1, further comprising an applying unit that applies a conveyance load to the recording medium that is conveyed to a transfer position at which an image on the holding body is transferred to the recording medium.

6. The image forming apparatus according to claim 5, wherein the applying unit is a sliding member that is disposed adjacent to but without contacting a surface of the transfer body and slides against the recording medium that is conveyed.

7. The image forming apparatus according to claim 5, wherein the applying unit is a rotating member that is disposed adjacent to but without contacting a surface of the transfer body and rotates while making contact with the recording medium that is conveyed.

* * * * *